United States Patent [19]

Gusmano et al.

[11] Patent Number: 5,519,441
[45] Date of Patent: May 21, 1996

[54] APPARATUS AND METHOD FOR CORRECTING OFFSET AND GAIN DRIFT PRESENT DURING COMMUNICATION OF DATA

[75] Inventors: Donald J. Gusmano, Henrietta; Whynn V. Lovette, Webster; Frederick O. Hayes, III, Ontario; Robert J. Rossi, Rochester, all of N.Y.

[73] Assignee: Xerox Corporation, Stamford, Conn.

[21] Appl. No.: 83,583

[22] Filed: Jul. 1, 1993

[51] Int. Cl.$^6$ .................... H04N 5/225; H04N 1/46; G06K 7/10
[52] U.S. Cl. .................... 348/207; 348/257; 348/294; 348/691; 358/504; 382/321
[58] Field of Search .................... 348/207, 209, 348/229, 255, 264, 266, 298, 294, 324, 257, 678, 691; 382/65, 67; 358/504, 516

[56] References Cited

U.S. PATENT DOCUMENTS

| | | | |
|---|---|---|---|
| 3,952,144 | 4/1976 | Kolker | 178/6 |
| 4,216,503 | 8/1980 | Wiggins | 358/280 |
| 4,555,732 | 11/1985 | Tuhro | 358/213 |
| 4,602,291 | 7/1986 | Tames | 348/243 |
| 4,853,795 | 8/1989 | Morton et al. | 358/447 |
| 4,901,105 | 2/1990 | Pisano | 355/51 |
| 4,903,144 | 2/1990 | Stefanik et al. | 358/461 |
| 4,920,428 | 4/1990 | Lin et al. | 348/255 |
| 5,038,225 | 8/1991 | Maeshima | 358/461 |
| 5,121,230 | 1/1992 | Homma et al. | 358/494 |
| 5,153,929 | 10/1992 | Itagaki | 382/65 |
| 5,157,518 | 10/1992 | Ohtaki et al. | 358/461 |
| 5,177,621 | 1/1993 | Ohtaki et al. | 358/406 |
| 5,204,730 | 4/1993 | Richmond et al. | 355/326 |
| 5,267,053 | 11/1993 | Potucek et al. | 358/446 |
| 5,268,765 | 12/1993 | Yamashita | 358/213.31 |
| 5,276,478 | 1/1994 | Morton | 355/22 |

FOREIGN PATENT DOCUMENTS

| | | |
|---|---|---|
| 853032845 | 11/1985 | European Pat. Off. . |
| 88300420.2 | 1/1988 | European Pat. Off. . |
| 89/04776 | 10/1989 | European Pat. Off. . |
| WO90/04900 | 10/1989 | WIPO . |

Primary Examiner—Wendy R. Greening
Assistant Examiner—Bipin Shalwala
Attorney, Agent, or Firm—Michael J. Nickerson

[57] ABSTRACT

The present invention is directed to a system and method for compensating for offset and gain drift in a fast scan direction during an image forming process. To achieve compensation, the present invention samples a plurality of permanently darkened pixels upon powering up image sensors and circuitry therefor and during a sub-scanning process of an image and feeds this information into an offset value generating circuit. The offset generating circuit continually adjusts a pixel offset voltage according to a difference between sequential samples of the permanently darkened pixel, thereby compensating for fast scan offset drift. The present invention also samples a plurality of active pixels during a scanning of a calibration strip. From this scan, a gain corrective value is calculated. The present invention then samples active pixels during a scanning of a platen background. In response to this sampling, the gain corrective value is continually adjusted according to a difference between sequential samples of the platen background, thereby compensating for fast scan gain drift. The present invention can also compensate and balance transfer functions for a plurality of communication channels in a multi-channel system by using the same target values and same reference signals for each channel.

28 Claims, 20 Drawing Sheets

GOTO FIGURE 18

APPARATUS AND METHOD FOR CORRECTING OFFSET AND GAIN DRIFT PRESENT DURING COMMUNICATION OF DATA

FIELD OF THE PRESENT INVENTION

The present invention, generally, is directed to a device for compensating offset and gain drift present in the communication of electronic data, and particularly, in the communication of image data in an image processing apparatus. More specifically, the present invention is directed to a method and apparatus for correcting offset and gain drift in an image pick up device or scanner and for compensating for offset and gain characteristics in a single channel of a communication path as well as balancing transfer or response functions of a plurality of channels in a multichannel system which are utilized to transfer video or image data.

BACKGROUND OF THE PRESENT INVENTION

A problem prevalent in the communication of electronic data, especially, image or video data, is offset drift and gain drift. Offset and gain drift can be caused by the characteristics of individual components responsible for processing or communicating the image data; i.e., a shift register functioning as a buffer for the signals received from a charged coupled device (CCD) may have inherent offset and gain characteristics unique to itself or a scanner may contribute to offset and gain drift due to the present operating conditions; i.e., the operating temperature, light temperature, age, etc. Moreover, offset and gain drift may be attributed to the individual characteristics of the channel transporting the data from one component to another during the processing cycle. If offset drift or gain drift is not adequately addressed; i.e., the signal being processed is not adjusted to counteract the offset or gain drift; the processing of the signal will not be accurate which, in an image processing system, can cause the generated picture or image to have a lower quality.

In systems employing image viewing devices, such as charge coupled devices (CCDs), for viewing by raster scanning an original, the output signal produced by the CCD includes a potential attributable to the inherent operating characteristics of the CCD. To restore the image output signal of the CCD to a true or absolute value, the potential derived from the CCD, referred to as the offset potential or signal, must be removed from the image signal. However, if the offset signal that is removed is greater or less than the actual offset signal, a noticeable aberration or distortion in the image output signal may result. Since the operating characteristics of a CCD often vary widely from one CCD to another and even vary from time to time for the same CCD or for different integration rates, the accurate determination of the offset signal to be removed is often difficult. The problem is further complicated in systems where multiple CCDs are employed.

Operating systems utilizing the afore-mentioned image viewing devices are designed for a fixed image signal gain. However, since the operating characteristics of an individual CCD in an imaging device may vary, the signal gain may vary from one CCD to another, or may even vary for the same CCD. Thus, where a system is optimized for a specific CCD operating at a specific speed, one would have to redesign or recalibrate the system to accommodate a change in gain due to changes in the operating characteristics of the CCD or if the CCD is replaced with another one.

To address these problems, typical image processing systems or image scanning systems perform calibrations of the image sensor once every predetermined number of scans. In most cases, the predetermined number of scans is less than ten, but, many systems calibrate the image sensor prior to each scan. Even though these systems have addressed the problem of offset and gain drift, the compensation techniques used in these systems, as will be discussed below, do not fully compensate for integral changes in offset or gain characteristics and are not readily adaptable to systems which must process data at a high speed, for example, a constant velocity transport image processing apparatus.

An example of a device which performs calibration once every predetermined number of scans is the device disclosed in U.S. Pat. No. 3,952,144 to Kolker. Kolker discloses that a facsimile transmitter makes a preliminary calibrating scan in which the transmitter sequentially scans a known black area and a known white area. An automatic background and contrast control unit stores a first sample of the uncorrected video signal which represents the scanned black area and stores a second sample of the uncorrected video signal which represents the scanned white area. During subsequent scanning, the automatic background and contrast control unit continually produces voltages representing the stored black and white samples and uses these voltages to correct the video signal received during the scanning of the document.

Another example of a device which corrects for offset and gain drift is disclosed in U.S. Pat. No. 4,555,732 to Tuhro. This U.S. Patent discloses an image sensor correction system which maintains the offset voltages in the shift registers of a multi-channel image sensor substantially equal. U.S. Pat. No. 4,555,732 discloses that a pair of control gates permits sampling the current offset voltages in the shift register of each channel to provide an adjusted potential for balancing any differences between the shift registers. More specifically, U.S. Pat. No. 4,555,732 discloses a device which compares the various offsets of a plurality of shift registers and determines a single offset potential to be applied to each shift register according to the comparison.

A device which proposes to correct gain and offset drift due to changes in the operating characteristics of a CCD is disclosed in U.S. Pat. No. 4,216,503 to Wiggins. U.S. Pat. No. 4,216,503 discloses a system where dark and light level signals are isolated and processed by a microprocessor unit in accordance with a pre-established routine to provide an offset potential and gain multiplicand. The determined offset potential and gain multiplicand are used to remove the offset and set a signal gain for the next succeeding line of image signals. The process is then repeated for each line of image signals to be outputted from the CCD.

Although U.S. Pat. No. 4,216,503 discloses a device to correct offset and gain drift on a continual basis, such a process is not adaptable to correct offset or gain drift in a high speed copier or drift in a fast scan direction because this method only corrects for offset drift or gain drift in a slow scan direction. In other words, the technique disclosed by U.S. Pat. No. 4,216,503 adjusts the offset gain value only upon the completion of a scanning of a full line of data.

Another problem associated with the correction of offset and gain drift is the establishment of reference values through calibration. In a typical platen scan configuration, calibration is not a substantial problem since the carriage can scan the calibration target before the scanning of each individual document. However, in a constant velocity transport system, the carriage is stationary, and thus, it is practically impossible to scan a calibration target before each individual scanning of a document. Therefore, with respect to a constant velocity transport system, it is necessary to have a calibration system wherein an unlimited number of scans can be made between actual generation of calibration values and still adequately compensate for offset and gain drift due to the prevailing operating conditions.

To realize this goal, the factors that cause the system to have to be recalibrated have to be corrected. These factors are typically profile drifts due to thermal changes in the sensor bar, video circuits, or the illumination system. The drifts can be in the form of offset changes or gain changes and can occur in the fast scan direction or the slow scan direction. It is noted that there are many methods which address the slow scan drift correction. Among these methods are the lamp intensity control method, automatic gain control method, a D.C. restore method, and the methods discussed above.

However, these various methods have not been able to correct changes in the form of offset and gain that occur in the fast scan direction, nor are these methods effective in a constant velocity transport system. Moreover, with the recent development of full width array systems, the drift changes in the fast scan direction as well as the gain changes in the fast scan direction become more prevalent, notwithstanding the system being used; i.e., platen scan or constant velocity transport. This is due to the fact that the full width arrays are made of several smaller arrays joined together in a butted or staggered manner.

With respect to the problems of drift in a full width array system, the two types of drift that need to be address are offset and gain. Fast scan offset drift is caused by temperature changes and differences between the individual sensor chips or video channels. On the other hand, fast scan gain changes are caused by either changes in the profile of the lamp changing due to thermal operating characteristics of the lamp or by gain drift in the actual sensor chip or the video channels.

Another component or aspect of an image processing system which experiences problems with gain drift and offset drift is the actual channels utilized to transfer or communicate the image data between points within the image processing system. More specifically, in analog video systems, where there are multiple channels of image or video data, it is important that each channel has the same transfer function or response characteristics. Any differences between the channels can produce differences in the final image that is outputted. These differences may show up as channel banding or streaking. Even though each channel might be identical in design, there are various tolerances associated with the components of each channel and hence there will always be a slight difference in the performance for each channel.

The difficulty with the prior art compensation systems, an example is illustrated in FIG. 1, is that these systems cannot compensate for offset and gain drift in the fast scan direction or be readily implemented in a high speed copier configuration as illustrated in FIG. 2. A compensation system must be able to quickly adjust the offset and gain settings for changes in operating characteristics, and more specifically, to characteristic changes realized along a fast scan direction. To achieve this, a system must be able to respond quickly and without generation of calibration values during the scanning process.

OBJECTS AND SUMMARY OF THE PRESENT INVENTION

It is an object of the present invention, therefore, to provide a method or system that readily responds to offset and gain changes in the fast scan direction and is adaptable to high speed copiers.

It is another object of the present invention to compensate for offset drift in a fast scan direction and gain drift in a fast scan direction.

It is still further an object of the present invention to compensate for offset drift in a communication channel and gain drift in a communication channel.

Another object of the present invention is to provide a system which can continually adjust for offset and/or gain drift in a high speed copier which does not require a recalibration process after an individual scanning of a document.

A still further object of the present invention is to provide a system which corrects for offset and/or gain drift within individual channels transporting data.

A further object of the present invention is to provide a system which balances the transfer functions or response characteristics of a plurality of channels in a multi-channel system, thereby avoiding channel banding or streaking.

Another object of the present invention is to provide a method and system which compensates for offset and/or gain drift when utilizing a constant velocity transport system.

One aspect of the present invention corrects gain drift in a fast scan direction during an image forming process in an image apparatus. This embodiment samples a plurality of active pixels during a scanning of a calibration strip. The present invention then calculates a gain corrective value from the collected sample. The present invention also samples the active pixels during a scanning of a platen background. From these samples the gain corrective value is adjusted continually according to a difference between sequential samples of the platen background and applied to image data signals produced by active pixels.

Another aspect of the present invention is a system for correcting offset drift in a fast scan direction during an image forming process in an image apparatus having image sensors including a plurality of active pixels and permanently darkened pixels and control circuitry therefor. The system samples the plurality of permanently darkened pixels upon powering up the image sensors and the control circuitry therefor and during a fast scan of an image. An offset circuit generates and applies a pixel offset voltage to image data signals produced by the plurality of active pixels according to a difference between sequential samples of the permanently darkened pixel.

A third aspect of the present invention is a system for balancing an offset characteristic for a multi-channel system in an image apparatus having image sensors including a plurality of active pixels and permanently darkened pixels and control circuitry therefor. The system samples an output of each channel. A channel offset circuit generates and applies a separate channel offset voltage to each channel, the channel offset voltage continually changing according to sequential samples of each channel.

A fourth aspect of the present invention is a system for correcting gain drift in a fast scan direction during an image forming process using a platen background in an image apparatus having image sensors including a plurality of active pixels and permanently darkened pixels and control circuitry therefor. The system samples the plurality of active pixels during a scanning of a calibration strip and calculates a gain corrective value from the collected samples. The system further samples the active pixels during a scanning of the platen background. A pixel gain circuit adjusts the gain corrective value according to a difference between sequential samples of the platen background and applies the adjusted gain corrective value to image data signals produced by active pixels.

A fifth aspect of the present invention is a system for balancing a gain characteristic for a multi-channel system in an image apparatus. The system samples an output of each channel. A channel gain circuit then generates and applies a separate channel gain to each channel, the channel gain continually changing according to sequential samples of each channel.

A sixth aspect of the present invention is a method for correcting offset drift in a fast scan direction during an image forming process in an image apparatus having image sensors including a plurality of active pixels and permanently darkened pixels and control circuitry therefor. The method samples a plurality of permanently darkened pixels upon powering up image sensors and control circuitry thereof and during a sub-scanning process of an image. This embodiment generates and applies a pixel offset voltage to image data signals produced by a plurality of active pixels, the pixel offset voltage continually changing according to a difference between sequential samples of the permanently darkened pixel.

A seventh aspect of the present invention is a method for correcting a gain characteristic for a communication channel of a video system. The present invention injects a channel white reference signal onto a channel and samples an output of the channel downstream of a point where the channel white reference signal was injected. From the samples a gain value is calculated for the channel. The present invention then applies a gain to the channel according to the calculated gain value.

An eighth aspect of the present invention is a method for correcting an offset characteristic for a communication channel of a video system. This method injects a channel black reference signal onto a channel and samples an output of the channel downstream of a point where the channel black reference signal was injected. From the samples an offset value is calculated for the channel. The present invention then applies an offset voltage to the channel according to the calculated offset value.

Further objects and advantages of the present invention will become apparent from the following description of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention wherein.

DETAILED DESCRIPTION OF THE DRAWINGS

Figure 1:
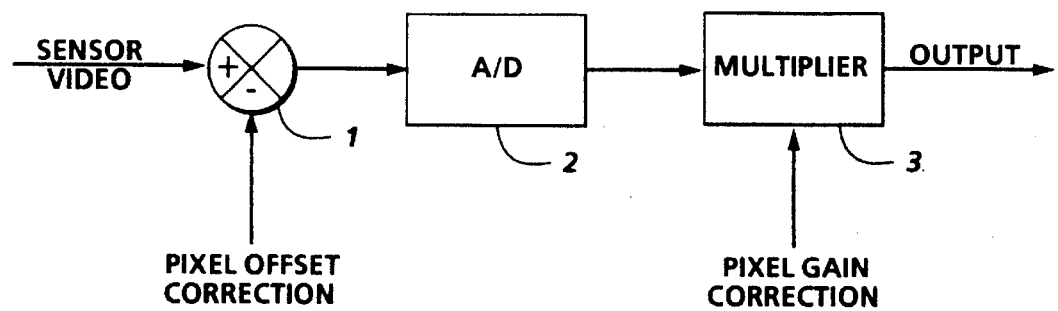
FIG. 1 shows a block diagram illustrating an example of a prior art circuit which compensates for offset and gain problems.

The following will be a detailed description of the drawings illustrating the present invention. In this description, as well as in the drawings, like reference numerals represent the devices or circuits or equivalent circuits which perform the same or equivalent functions.

Figure 2:
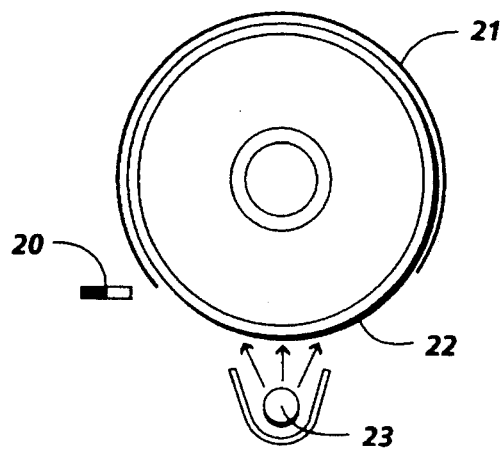
FIG. 2 illustrates an example of a prior art constant velocity transport system.
Figure 3:
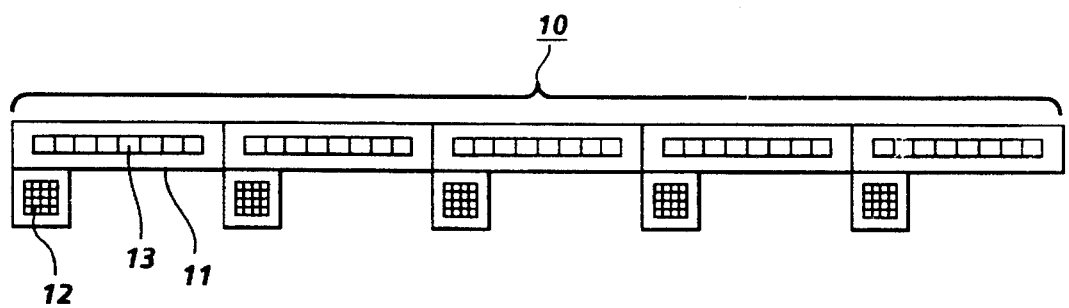
FIG. 3 illustrates an example of a full width array system utilized by the present invention.
Figure 4:
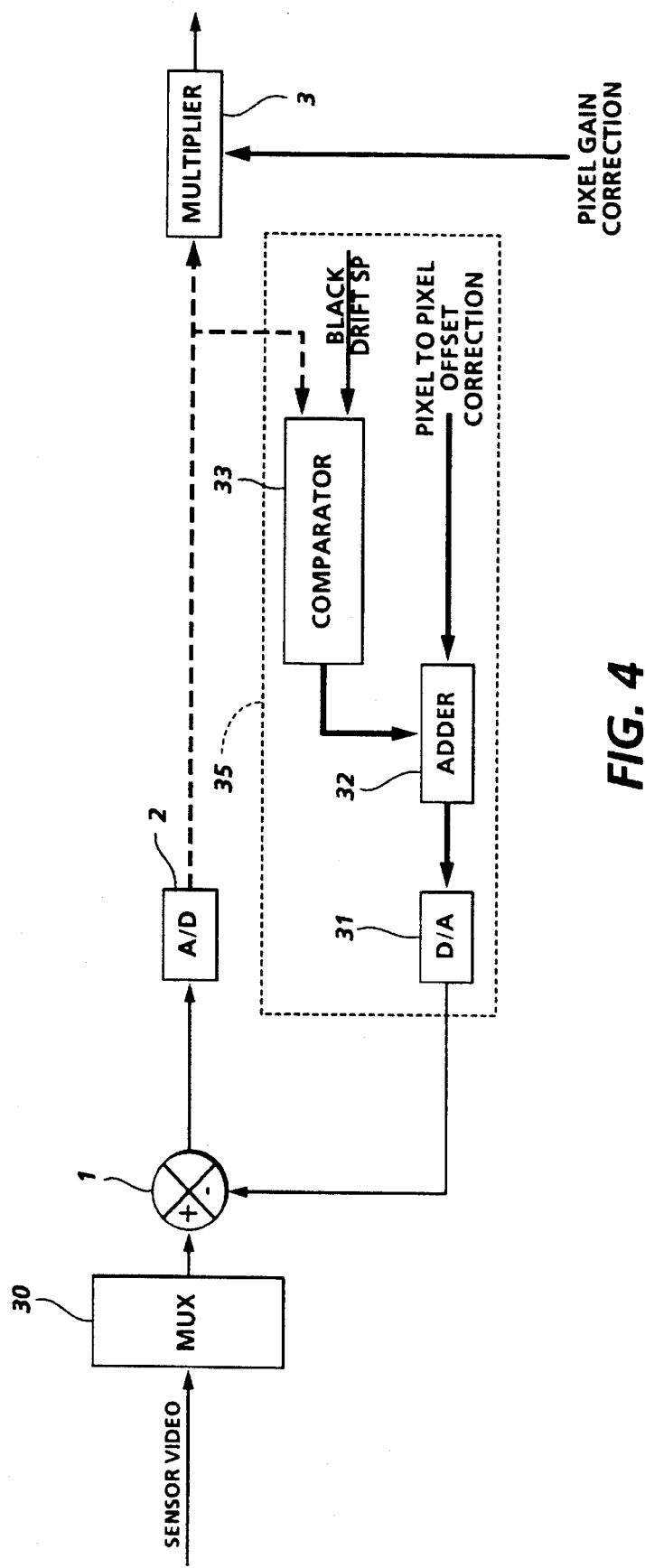
FIG. 4 shows a block diagram illustrating one embodiment of the present invention which compensates for offset drift in the fast scan direction.

FIG. 4 shows a block diagram illustrating one embodiment of the present invention which compensates for offset drift in either a fast scan direction or for a constant velocity transport system, as illustrated in FIG. 2. In other words, FIG. 4 illustrates a block diagram of a circuit which can compensate for the individual offset of an individual pixel if there is a one-to-one correspondence between permanently darkened pixels and active pixels. However, in the preferred embodiment, a small set of permanently darkened pixels are formed on each individual sensor chip, as illustrated in FIG. 3, so that offset drift can be compensated for on an individual chip scale or smaller.

In FIG. 4, a video or image signal from a sensor is inputted into a multiplexer 30. Moreover, the multiplexer 30 receives black reference signals as part of the sensor video data at predetermined locations within the data stream. These black reference signals are produced from the sampling of permanently darkened pixels 12, as illustrated in FIG. 3. The black reference signal is a signal which represents the situation where the sensor would receive no light.

With respect to the present invention, a sensor could be any type of device capable of receiving image data in an optical manner. In the preferred embodiment of the present invention, the sensors are charged coupled devices (CCDs) constructed to form a full width array. This full width array can be constructed by either butting together smaller arrays of charge coupled devices (sensor chips), or staggering smaller arrays of charge coupled devices. In these charge coupled devices, individual active pixels are utilized to sense the received light and produce an electrical signal represented thereof.

An example of a full width array charge coupled device 10 is illustrated in FIG. 3. In FIG. 3, a plurality of pixels are arranged on individual sensor chips 11. These pixels comprise a set of active pixels 13 which are used to actually convert the received image into electric signals and a small set of adjacent permanently darkened pixels 12 which are utilized in the determination of the offset corrective value.

In a preferred embodiment of the present invention, each individual sensor chip 11 has associated therewith a plurality of active pixels 13 and a small set of permanently darkened pixels 12. However, it is possible to have a single permanently darkened pixel corresponding to each individual active pixel in lieu of a group of permanently darkened pixels 12 corresponding to a larger set of active pixels 13.

Referring back to FIG. 4, the image signals produced by the active pixels 13 are inputted to the multiplexer 30 as sensor video data. Black reference signals produced by the permanently darkened pixels 12 are inputted to the multiplexer 30.

The multiplexer 30 is connected to an adder 1 which adds in a predetermined offset correction value to the sensor video data. During initial calibration, this offset correction value is zero so that an initial offset can be determined from monitoring the permanently darkened pixels 12. After adding in the offset correction value, the adder 1 outputs a signal to an analog to digital converter 2. The analog to digital converter 2 converts the analog data, which has been corrected for offset, into a digital signal and inputs the digital signal into a multiplier 3. Multiplier 3 multiplies the digital signal from the analog to digital converter 2 with a gain corrective value.

With respect to FIG. 4, the gain corrective value can be a gain value calculated using a conventional method and the value can be associated with the full scanner, an individual sensor chip, a determined segmentation of the scanner, or an individual pixel depending upon the gain control methodology being employed and the chosen segmentation of the full width array.

To determine the offset correction value, one embodiment of the present invention, as illustrated in FIG. 4, utilizes a circuit comprising a comparator 33, an adder 32, and a digital to analog converting circuit 31. These three circuits make up an offset corrective value generating circuit 35. The offset corrective value generating circuit 35 receives a reference value corresponding to the offset drift set point determined by an initial scanning of the permanently darkened pixels 12 upon powering up of the image sensors and the circuitry therefor. This powering up routine may occur upon the initial application of power to the image processing apparatus or if the image processing apparatus has energy saving features, the powering up routine which would correspond to the actual application of power to the image sensors and circuitry therefor prior to the actual scanning process. The offset corrective value generating circuit 35 also receives a pixel-pixel offset correction value which represents a previously determined offset corrective value corresponding to the initial calibration steps executed prior to a scanning process and a signal corresponding to the black reference signal outputted by the permanently darkened pixels 12 during the present fast scan or sub-scanning process.

It is noted that the detailed description of the present invention uses the terms fast scan and sub-scan, interchangeably. These terms refer to the electronic scanning carried out by the image sensors. The terms, main scan or slow scan, refer to the physical movement of the scanner or image during a complete scanning process. Lastly, the term, complete scan, refers to the full scanning process of an entire image.

In the offset corrective value generating circuit 35, the offset drift set point signal and a signal representing the black reference signal are fed into a comparator 33. This comparator 33 determines whether the black reference signal generated by the permanently darkened pixels 12 during the sub-scanning process has changed in comparison to the signal outputted by same permanently darkened pixels 12 during power-up or the previous sub-scan (the offset drift set point signal).

If the two signals are different, the comparator 33 generates a signal representing an adjustment value corresponding to this difference between the recent signal being produced by the permanently darkened pixels 12 and the signal produced at the time of power-up or a previous sub-scan. This signal is then fed into adder 32 which adds the adjustment value to the pixel-pixel offset corrective value determined during calibration. In other words, the adding of the adjustment value to the pixel-pixel offset corrective value provides offset compensation on a continual basis based upon the present operating characteristics or conditions of the image processing apparatus. The adjusted pixel-pixel offset correction value is then inputted into a digital to analog converter 31 which converts the digital signal to an actual voltage value representing the fast scan offset corrective value that is inputted into the adder 1.

In the above embodiment, offset is determined in a conventional manner. More specifically, a reference signal representing a zero value; in this case, a signal from one of the permanently darkened pixels since a non-receipt of light in a scanner conventionally produces a zero level signal; is fed into the system. Any voltage sampled above the zero value is considered an offset, and thus, this offset value is retained for future scans and subtracted from subsequent signals so that a non-receipt of light signal will be a zero value. It is also noted that any reference value other than zero could be used to determine the offset.

Figure 5:
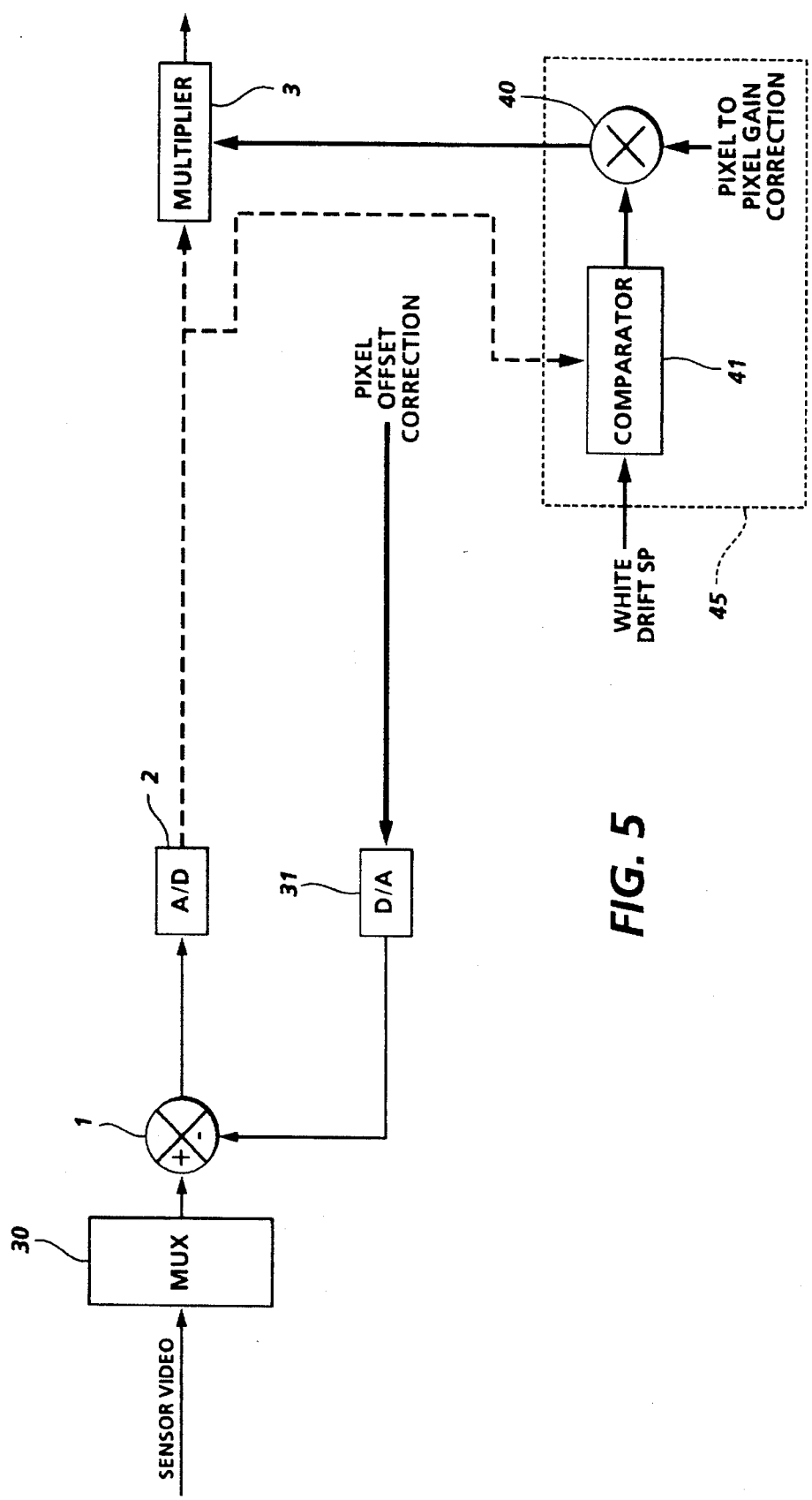
FIG. 5 shows a block diagram illustrating another embodiment of the present invention which compensates for gain drift in the fast scan direction.

FIG. 5 shows a block diagram illustrating another embodiment of the present invention which corrects for gain drift in a fast scan direction or for a constant velocity transport system. FIG. 5 includes a multiplexer 30, an adder 1, an analog to digital converter 2, a multiplier 3, and a gain corrective value generating circuit 45. This gain corrective value generator circuit 45 has a comparator 41 and a multiplier 40. As with FIG. 4, upon powering up the circuitry corresponding to the image sensors, a sample of a calibration strip is taken and a pixel-pixel gain corrective value is determined. Also, the platen background is sampled and the value therefrom is saved as a reference value for the fast scan profile. This reference value corresponds to the white drift or gain drift set point inputted into the comparator 41.

In the present invention, the pixel-pixel gain corrective value can be divided into a multitude of segments wherein one segment can correspond to one sensor chip. However, the segmentation can be greater; i.e., more than one segment per chip; or less; i.e., more than a chip per segment. It is noted that the selection of the segmentation can affect image quality. However, the gain reference values for each segment are averaged to produce a single value reference. It is noted that white reference signals from each chip could be isolated such that a gain reference value can be saved for each chip so that the gain corrective value can be individualized for each chip.

Between individual scans of a document, when the carriage is in a parked position (the position is illustrated in FIG. 2 with reference to a constant velocity transport system wherein the scanner 23 can sample the platen background 22 that is located between individual documents 21), the platen background 22 is sampled again to generate a white reference signal as sensor video data which the multiplexer 30 selects to be inputted into the adder 1. This white reference signal is inputted into the comparator 41 to be compared with the gain or white drift set point. The comparator 41 compares the white reference signal with the gain or white drift set point to determine if there has been a change in the gain characteristics of the sensor chip or full width array system.

If there is a difference between the white drift set point and the white reference signal, the comparator generates an adjustment signal or value corresponding to this difference. If the gain compensation methodology calls for segmentation, the adjustment signal is broken down according to a weighting scheme, and individual adjustment signals are used to make individual adjustments to the segmented pixel-pixel gain corrective value. The weighting scheme, for example could be a factor of 0.1 for each segment if there are ten segments, or could be factors of 0.1, 0.2, 0, 0.1, 0.5, 1.5, 0.75, 1.25, 0, and 2 if there are ten segments. The actual weighting scheme can be implemented to correspond to the unique characteristics of the scanner.

These adjustment signals are fed to a multiplier 40 which multiplies the adjustment signals with the pixel-pixel gain corrective values to produce adjusted gain corrective values. The multiplier 40 outputs the adjusted gain corrective values to a multiplier 3 which multiples the actual image data to compensate for gain drift in the segments. Again, this adjustment can be individualized to each sensor chip without relying on a predetermined weighting scheme.

In the above embodiment, gain is determined in a conventional manner. More specifically, a reference signal representing a full light value is fed into the system; for example, 5 volts. After correction for offset, if offset is to be corrected, the remaining value of the signal outputted from the system is compared with 5 volts. If the outputted signal, for example, is 8 volts, the gain corrective value is determined to be 0.625 and used in subsequent scans so that all outputted full light values are 5 volts. On the other hand, if the outputted signal, for example, is 4 volts, the gain corrective value is determined to be 1.25 and used in subsequent scans. It is noted that any reference value other than 5 volts may be used.

Figure 6:
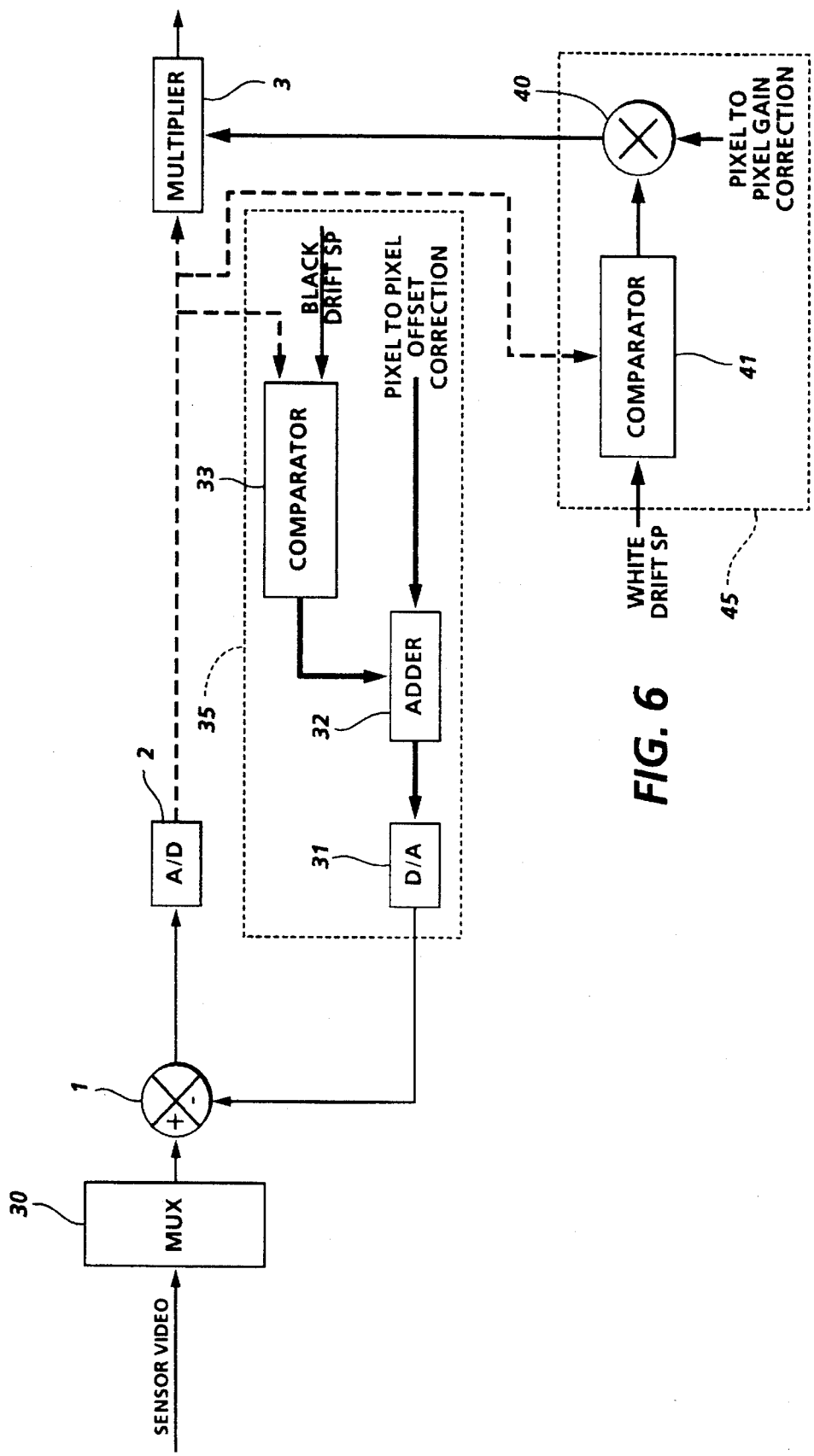
FIG. 6 shows a block diagram illustrating a third embodiment of the present invention which compensates for both offset and gain drift.

FIG. 6 shows a block diagram illustrating a third embodiment of the present invention which compensates for offset and gain drift in either a fast scan direction or for a constant velocity transport system, as illustrated in FIG. 2.

In FIG. 6, a video or image signal from a sensor is inputted into a multiplexer 30. Moreover, the multiplexer 30 receives black reference signals as part of the sensor video data at predetermined locations within the data stream. These black reference signals are produced from the sampling of permanently darkened pixels 12, as illustrated in FIG. 3. The black reference signal is a signal which represents the situation where a sensor would receive no light. The image signals produced by the active pixels 13 are inputted to the multiplexer 30 as sensor video data. The black reference signals are produced by the permanently darkened pixels 12.

The multiplexer 30 is connected to an adder 1 which adds in a previously determined offset correction value to the sensor video data. During initial calibration, this value is zero so that an initial offset can be determined from the permanently darkened pixels 12. After adding in the offset correction value, the adder 1 outputs a signal to an analog to digital converter 2. The analog to digital converter 2 converts the analog data, which has been corrected for offset, into a digital signal and inputs the digital signal into a multiplier 3. Multiplier 3 multiplies the digital signal received from the analog to digital converter 2 with a gain corrective value which will be discussed in more detail below.

To determine the offset correction value, FIG. 6 utilizes a circuit comprising a comparator 33, an adder 32, and a digital to analog converting circuit 31. These three circuits make up an offset corrective value generating circuit 35. This offset corrective value generating circuit 35 is similar to the offset corrective value generating circuit 35 of FIG. 4 in that it generates an offset corrective value in the same manner as described above with respect to FIG. 4. Therefore, a detailed description of this circuit will be omitted at this time.

To correct for gain drift in a fast scan direction or for a constant velocity transport system, FIG. 6 includes a gain corrective value generating circuit 45. This gain corrective value generator circuit 45 has a comparator 41 and a multiplier 40 and functions the same as the gain corrective value generator circuit described above with respect to FIG. 5. It is noted that FIG. 6 illustrates a system in which the offset is corrected prior to the gain calculation and correction. This is to insure an accurate calibration of the gain characteristics.

Figure 7:
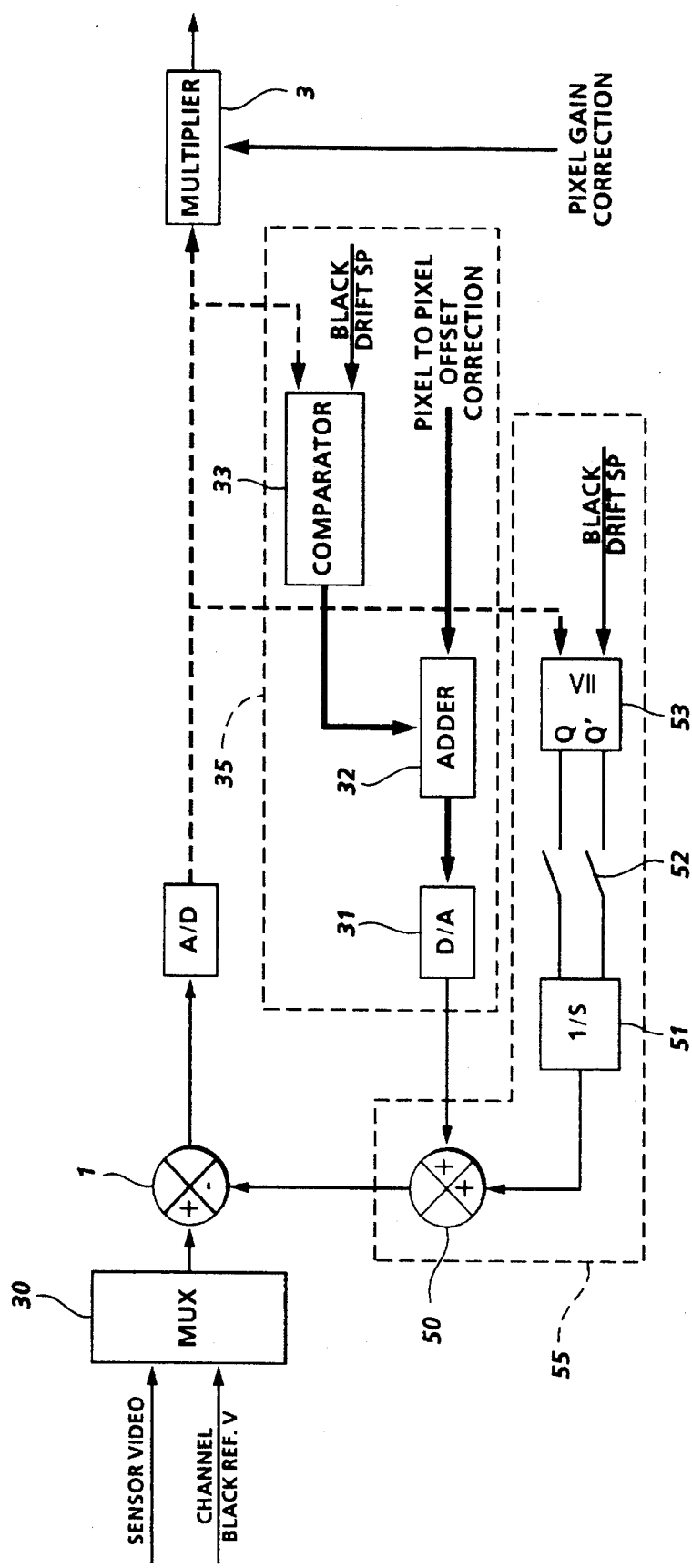
FIG. 7 shows a block diagram illustrating a fourth embodiment of the present invention which compensates for offset drift in a fast scan relationship as well as offset drift in a communication channel.

FIG. 7 shows a block diagram illustrating a fourth embodiment of the present invention which compensates for offset drift in a fast scan direction or for a constant velocity transport system, as illustrated in FIG. 2, and offset drift in a communication channel.

In FIG. 7, a video or image signal from a sensor is inputted into a multiplexer 30. Moreover, the multiplexer 30 receives black reference signals as part of the sensor video data at predetermined locations within the data stream. These black reference signals are produced from the sampling of permanently darkened pixels 12, as illustrated in FIG. 3. The black reference signal is a signal which represents the situation where a sensor would receive no light. The image signals produced by the active pixels 13 are inputted to the multiplexer 30 as sensor video data. The black reference signals are produced by the permanently darkened pixels 12 and inputted to the multiplexer 30 as a channel reference signal.

The multiplexer 30 is connected to an adder 1 which adds in a predetermined offset correction value to the sensor video data. During initial calibration, this offset correction value is zero so that an initial offset can be determined from the permanently darkened pixels 12. After adding in the offset correction value, the adder 1 outputs a signal to an analog to digital converter 2. The analog to digital converter 2 converts the analog data, which has been corrected for offset, into a digital signal and inputs the digital signal into a multiplier 3. Multiplier 3 multiplies the digital signal from the analog to digital converter 2 with a gain corrective value.

To determine the offset correction value, FIG. 7 utilizes a circuit comprising a comparator 33, an adder 32, and a digital to analog converting circuit 31. These three circuits make up an offset corrective value generating circuit 35. The offset corrective value generating circuit 35 receives a reference value corresponding to the offset drift set point determined by an initial scanning of the permanently darkened pixels 12 upon powering up of the image sensors and the circuitry therefor. The offset corrective value generating circuit 35 also receives a pixel-pixel offset correction value which represents a previously determined offset corrective value corresponding to the initial calibration steps executed prior to a scanning process and receives a signal corresponding to the black reference signal outputted by the permanently darkened pixels 12 during the present fast scan or sub-scanning process.

In the offset corrective value generating circuit 35, the offset drift set point signal and a signal or value representing the black reference signal are fed into a comparator 33. This comparator 33 determines whether the black reference signal generated by the permanently darkened pixels 12 during the actual scanning process has changed in comparison to the signal outputted by same permanently darkened pixels 12 during power-up or the previous sub-scan (the offset drift set point signal).

If the two signals are different, the comparator 33 generates a signal representing an adjustment value corresponding to the difference between the recent signal being produced by the permanently darkened pixels 12 and the signal produced at the time of power-up or a previous sub-scan. This signal is then fed into adder 32 which adds the adjustment value to the pixel-pixel offset corrective value determined during calibration. In other words, the adding of the adjustment value to the pixel-pixel offset corrective value provides offset compensation on a continual basis based upon the present operating characteristics or conditions of the image processing apparatus. The adjusted pixel-pixel offset correction value is then inputted into a digital to analog converter 31 which converts the digital signal to an actual voltage value representing the fast scan offset corrective value that is inputted into an adder 50.

FIG. 7 also includes a channel offset compensation circuit 55. This channel offset compensation circuit 55 has an adder 50, a variable voltage source 51, a switching circuit 52, and a comparator 53. Initially, a channel black reference signal is injected upon a channel through multiplexer 30. This channel black reference signal is sampled by the comparator 53 and compared with a black signal target value to establish an initial offset value point; i.e., the comparator 53 determines the offset value of the channel with respect to the difference between the channel black reference signal and the black signal target value.

Upon determining the offset value, comparator circuit 53 outputs a signal corresponding to the offset value. The signal is fed through a switching circuit 52 and applied to the variable voltage source 51. The variable voltage source 51 generates an offset voltage in response to the signal received from the switching circuit 52. The offset voltage is fed to adder 50 where it is added to the offset corrective value generated by the offset corrective value generating circuit 35 to produce a fully adjusted offset voltage. This fully adjusted offset voltage is then applied to the sampled channel via adder 1 to compensate for fast scan offset drift and offset drift within that channel.

During operations of the device, the comparator 53 samples subsequent transmissions of a channel black reference signal which are sent along a channel to determine whether the offset characteristics of the channel have changed due to operating conditions. The comparator 53 compares the subsequently sampled channel black reference signals with the same target value (black signal set point) to determined if there is a difference between the subsequently sampled channel black reference signal and the same target value. If there is a difference between the signals, the comparator 53 generates a new signal corresponding to the difference, thereby continually monitoring change in the offset characteristics. This new signal produced by the comparator 53 is outputted to the variable voltage source 51 through the switching circuit 52. In response to this new signal received from the comparator 53, the variable voltage source 51 generates a new offset voltage to be applied to the adder 50 to compensate for any change in offset characteristics of the channel.

Figure 8:
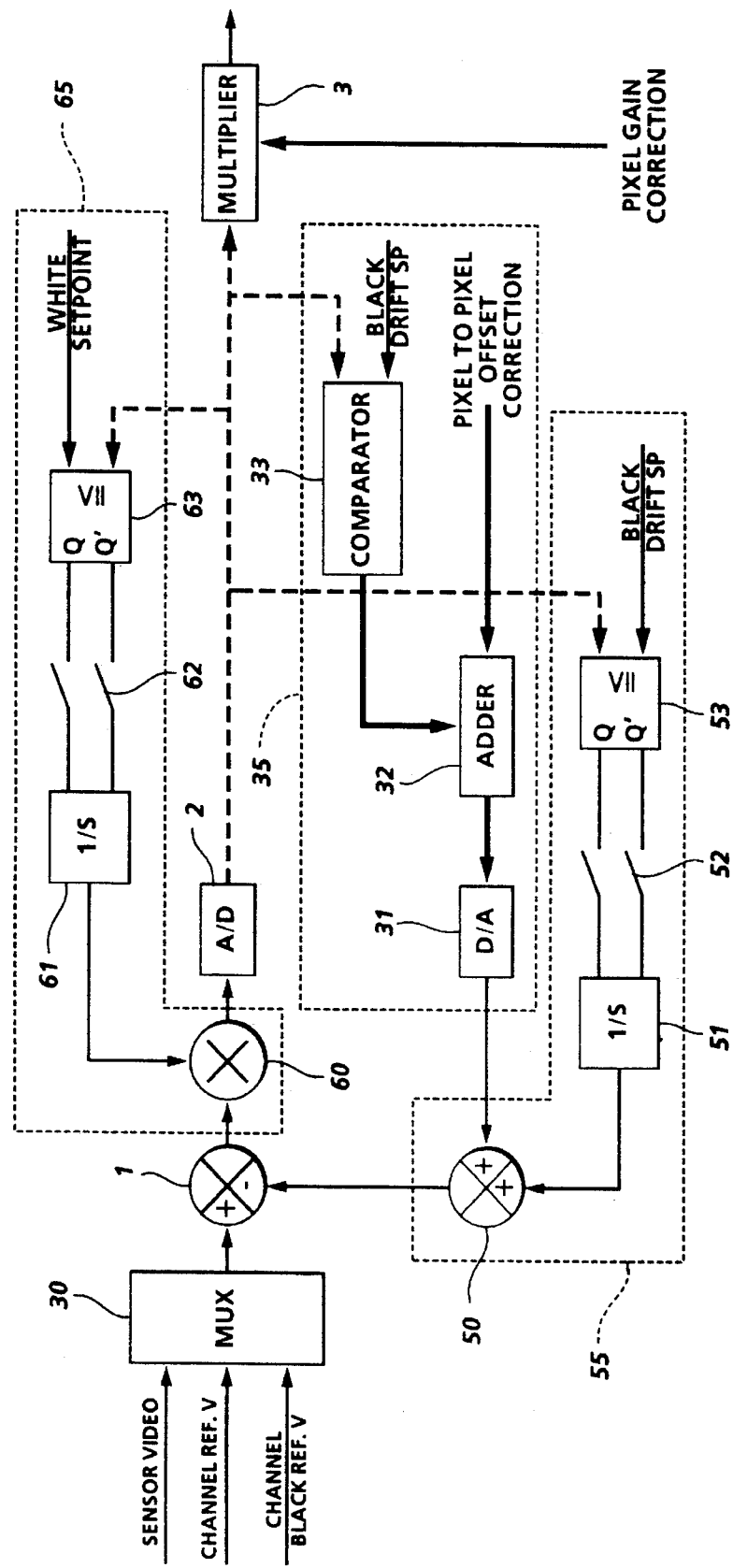
FIG. 8 shows a block diagram illustrating an embodiment of the present invention which compensates for offset drift with respect to a fast scan relationship and offset and gain drift with respect to a particular communication channel.

FIG. 8 shows a block diagram illustrating an embodiment of the present invention which compensates for offset drift in either a fast scan direction or for a constant velocity transport system, as illustrated in FIG. 2, and offset and gain drift in a communication channel.

In FIG. 8, fast scan offset drift and channel offset drift are compensated for in the same manner as described above with respect to FIG. 7. It is noted that to achieve a more accurate compensation for gain, the offset compensation should precede the gain compensation process. Since the offset compensation has already been described above, a detailed explanation thereof will be omitted with respect to FIG. 8.

FIG. 8 also includes a channel gain compensation circuit 65. This channel gain compensation circuit 65 has a multiplier 60, a variable signal generator 61, a switching circuit 62, and a comparator 63. Initially, a channel white reference signal is injected upon a channel through multiplexer 30 as a channel reference signal. This channel white reference signal is sampled by the comparator 63 and compared with a white signal target value to establish an initial gain value point; i.e., the comparator 63 determines the gain value of the channel with respect to the difference between the channel white reference signal and the white signal target value.

Upon determining the gain value, comparator circuit 63 outputs a signal corresponding to the gain value. The signal is fed through a switching circuit 62 and applied to the variable signal generator 61. The variable signal generator 61 generates a signal in response to the signal received from the switching circuit 62. This signal is then applied to the multiplier 60 of the sampled channel to correct for gain drift within that channel.

During operations of the device, the comparator 63 samples subsequent transmissions of a channel white reference signal which are sent along a channel to determine whether the gain characteristics of the channel have changed due to operating conditions. The comparator 63 compares the subsequently sampled channel white reference signals with the same target value (white signal set point) to determined if there is a difference between the subsequently sampled channel white reference signal and the same target value. If there is a difference between the signals, the comparator 63 generates a new signal corresponding to the difference, thereby continually monitoring changes in the gain characteristics. This new signal produced by the comparator 63 is outputted to the variable signal generator 61 through the switching circuit 62. In response to this new signal received from the comparator 63, the variable signal generator 61 generates a new signal to be applied to the multiplier 60 of the channel to compensate for any change in gain characteristics of the channel.

Figure 9:
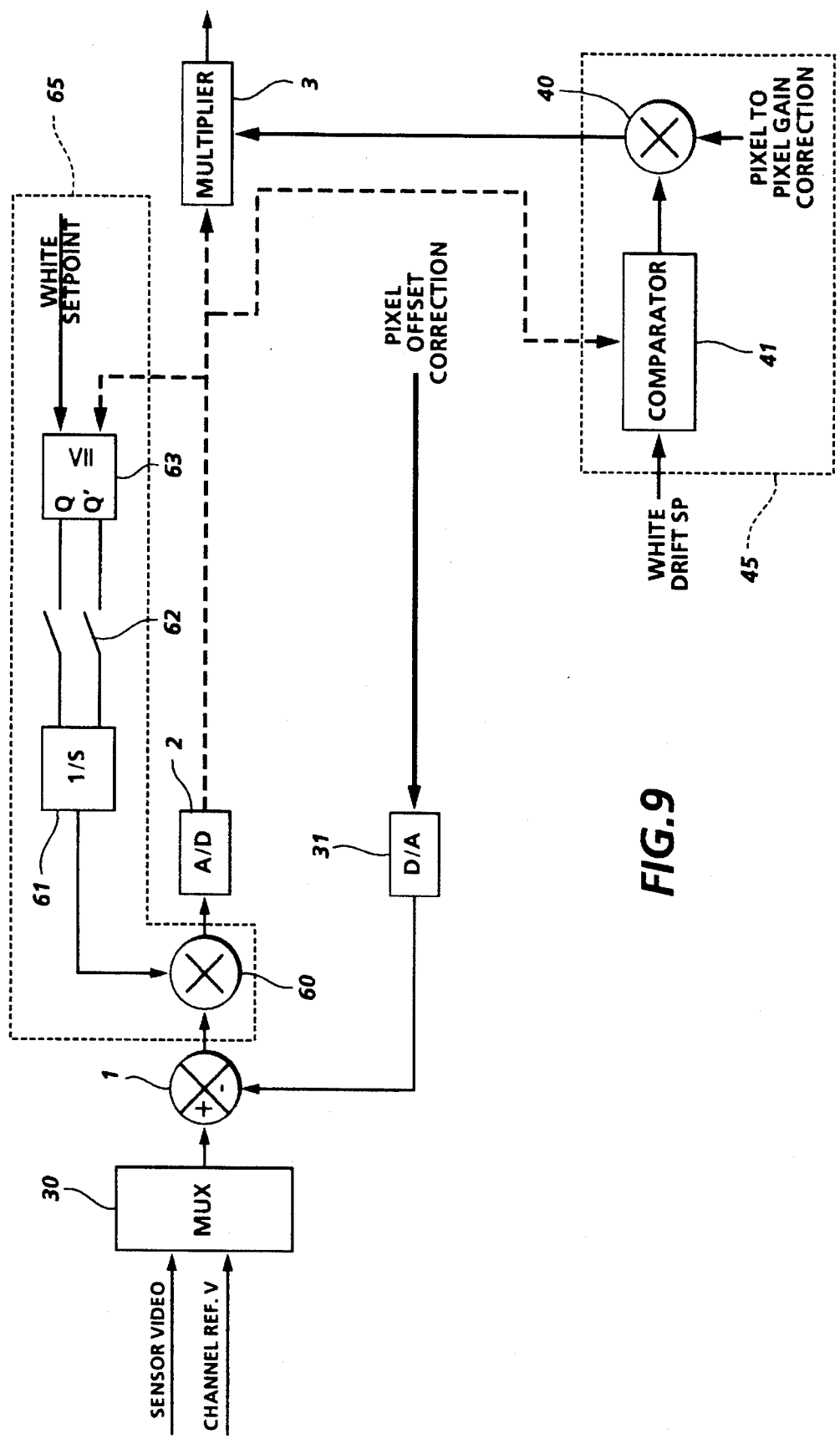
FIG. 9 shows a block diagram illustrating a sixth embodiment of the present invention which compensates for gain drift with respect to a fast scan relationship and gain drift with respect to a particular channel communication.

FIG. 9 shows a block diagram illustrating a sixth embodiment of the present invention which corrects for gain drift in a fast scan direction or for a constant velocity transport system and compensates for gain drift in a communication channel. FIG. 9 includes a multiplexer 30, an adder 1, an analog to digital converter 2, a multiplier 3, and a gain corrective value generating circuit 45. This gain corrective value generator circuit 45 has been fully described above with respect to FIG. 5, therefore, a detailed description thereof will be omitted with respect to FIG. 9. The offset value in this embodiment can be determined in a conventional manner and applied to the data signal through an adder 1.

FIG. 9 also includes a channel gain compensation circuit 65. This channel gain compensation circuit 65 has a multiplier 60, a variable signal generator 61, a switching circuit 62, and a comparator 63. These circuits and their corresponding functions have been fully described above with respect to FIG. 9. It is noted that in this preferred embodiment, as illustrated in FIG. 9, that the channel gain is compensated for prior to the fast scan gain drift. This order of compensation is preferred because channel compensation is a coarser adjustment than a fast scan compensation process.

Figure 10:
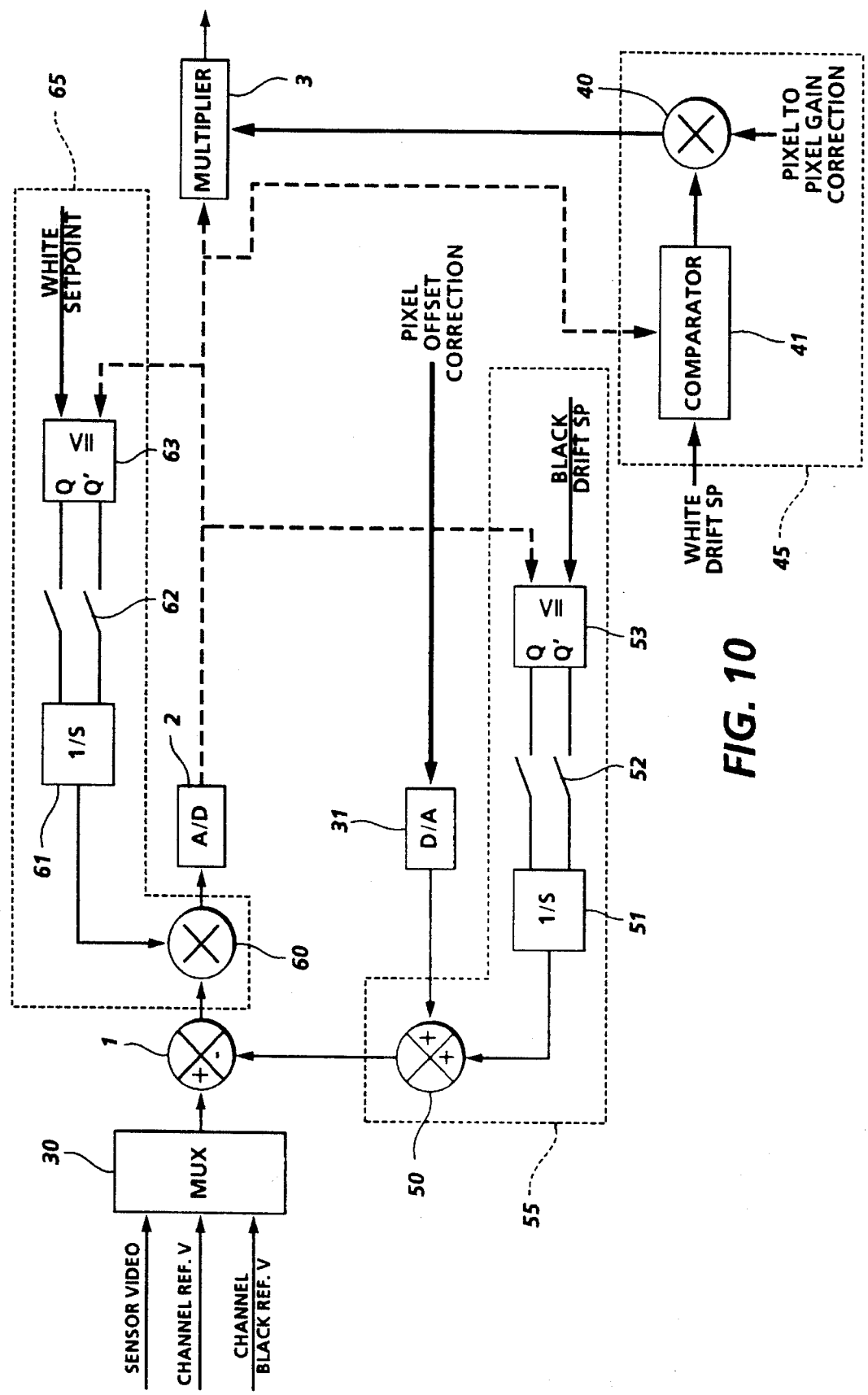
FIG. 10 shows a block diagram illustrating a seventh embodiment of the present invention which compensates for gain drift with respect to a fast scan relationship and offset and gain drift with respect to a particular communication channel.

FIG. 10 shows a block diagram illustrating a seventh embodiment of the present invention which corrects for gain drift in a fast scan direction or for a constant velocity transport system and compensates for offset and gain drift in a communication channel. FIG. 10 includes a multiplexer 30, an adder 1, an analog to digital converter 2, a multiplier 3, and a gain corrective value generating circuit 45. This gain corrective value generator circuit 45 has been fully described above with respect to FIG. 5, thus a detailed description here will be omitted. The offset value in this embodiment can be determined in a conventional manner and applied to the data signal through adder 1.

FIG. 10 also includes a channel offset compensation circuit 55. This channel offset compensation circuit 55 has an adder 50, a variable voltage source 51, a switching circuit 52, and a comparator 53. Initially, a channel black reference signal is injected upon a channel. This channel black reference signal is sampled by the comparator 53 and compared with a black signal target value to establish an initial offset value point; i.e., the comparator 53 determines the offset value of the channel with respect to the difference between the channel black reference signal and the black signal target value.

Upon determining the offset value, comparator circuit 53 outputs a signal corresponding to the offset value. The signal is fed through a switching circuit 52 and applied to the variable voltage source 51. The variable voltage source 51 generates an offset voltage in response to the signal received from the switching circuit 52. This offset voltage is added to offset corrective value in adder 50 to produce a fully adjusted offset corrective voltage. This fully adjusted offset corrective voltage is then applied to the sampled channel through adder 1 to correct for offset drift within that channel.

During operations of the device, the comparator 53 samples subsequent transmissions of the channel black reference signal which are sent along a channel to determine whether the offset characteristics of the channel have changed due to operating conditions. The comparator 53 compares the subsequently sampled channel black reference signals with the same target value (black signal set point) to determined if there is a difference between the subsequently sampled channel black reference signal and the same target value. If there is a difference between the signals, the comparator 53 generates a new signal corresponding to the difference, thereby continually monitoring changes in the offset characteristics. This new signal produced by the comparator 53 is outputted to the variable voltage source 51 through the switching circuit 52. In response to this new signal received from the comparator 53, the variable voltage source 51 generates a new offset voltage to be applied to the channel to compensate for any change in offset characteristics of the channel.

FIG. 10 further includes a channel gain compensation circuit 65. This channel gain compensation circuit 65 has a multiplier 60, a variable signal generator 61, a switching circuit 62, and a comparator 63. Initially, a channel white reference signal is injected upon a channel. This channel white reference signal is sampled by the comparator 63 and compared with a white signal target value to establish an initial gain value point; i.e., the comparator 63 determines the gain value of the channel with respect to the difference between the channel white reference signal and the white signal target value.

Upon determining the gain value, comparator circuit 63 outputs a signal corresponding to the gain value. The signal is fed through a switching circuit 62 and applied to the variable signal generator 61. The variable signal generator 61 generates a signal in response to the signal received from the switching circuit 62. This signal is then applied to the multiplier 60 of the sampled channel to correct for gain drift within that channel.

During operations of the device, the comparator 63 samples subsequent transmissions of the channel white reference signal which are sent along a channel to determine whether the gain characteristics of the channel have changed due to operating conditions. The comparator 63 compares the subsequently sampled channel white reference signals with the same target value (white signal set point) to determined if there is a difference between the subsequently sampled channel white reference signal and the same target value. If there is a difference between the signals, the comparator 63 generates a new signal corresponding to the difference, thereby continually monitoring changes in the gain characteristics. This new signal produced by the comparator 63 is outputted to the variable signal generator 61 through the switching circuit 62. In response to this new signal received from the comparator 63, the variable signal generator 61 generates a new signal to be applied to the multiplier 60 of the channel to compensate for any change in gain characteristics of each channel. It is noted in this preferred embodiment that the offset is compensated for prior to gain compensation, and also that the channel gain compensation is performed prior to fast scan gain compensation.

Figure 11:
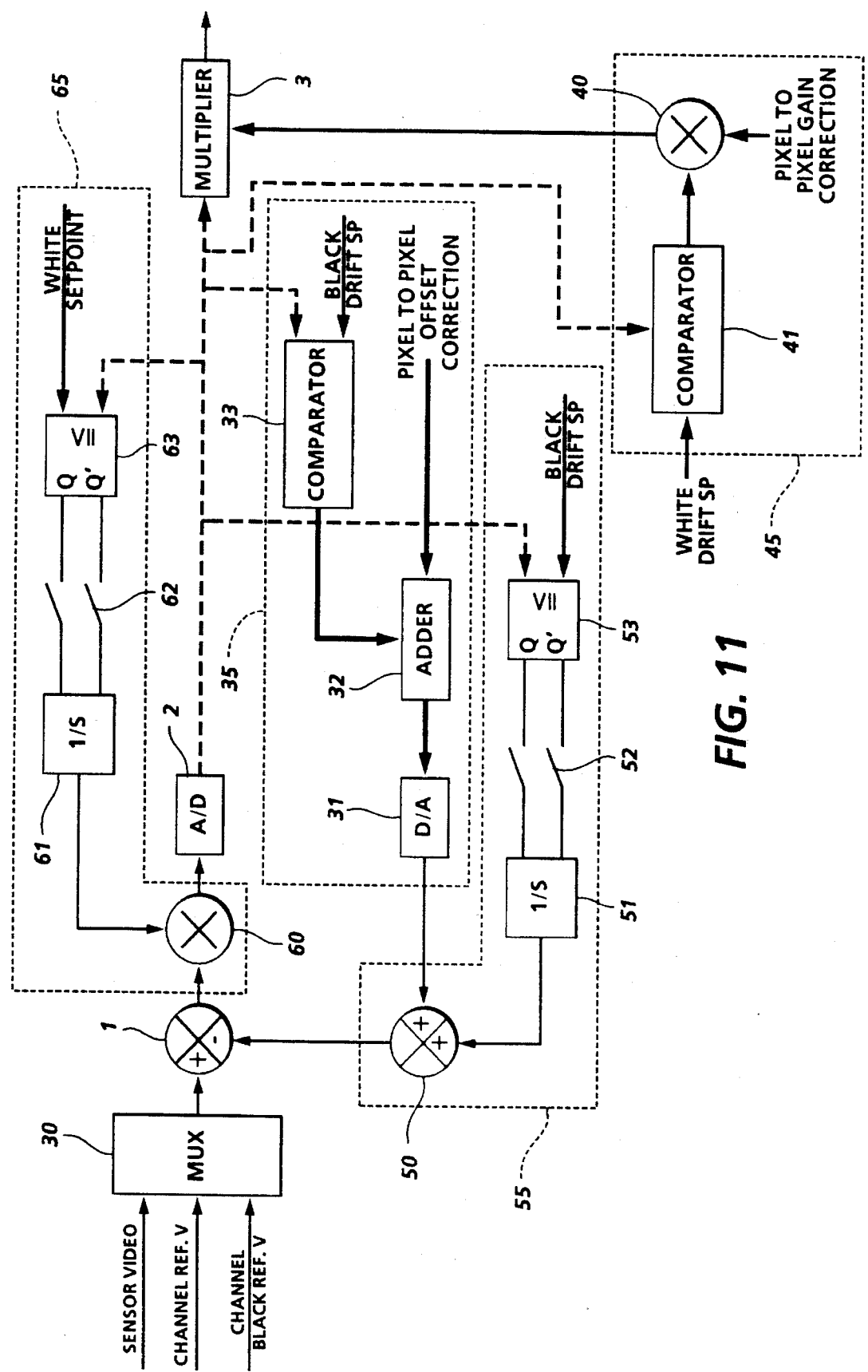
FIG. 11 shows a block diagram illustrating an eighth embodiment of the present invention which compensates for both offset and gain drift in a fast scan relationship and offset and gain drift with respect to a particular communication channel.

FIG. 11 shows a block diagram illustrating an eighth embodiment of the present invention which corrects for offset and gain drift in a fast scan direction or for a constant velocity transport system and compensates for offset and gain drift in a communication channel. FIG. 11 includes a multiplexer 30, an adder 1, an analog to digital converter 2, a multiplier 3, an offset corrective value generating circuit 35, and a gain corrective value generating circuit 45.

In FIG. 11, a video or image signal from a sensor is inputted into a multiplexer 30. Moreover, the multiplexer 30 receives black reference signals as part of the sensor video data at predetermined locations within the data stream. These black reference signals are produced from the sampling of permanently darkened pixels 12, as illustrated in FIG. 3. The black reference signal is a signal which represents the situation where a sensor would receive no light. The image signals produced by the active pixels 13 are inputted to the multiplexer 30 as sensor video data. The black reference signals are produced by the permanently darkened pixels 12 and inputted to the multiplexer 30.

The multiplexer 30 is connected to an adder 1 which adds in a predetermined offset correction value to the sensor video data. During initial calibration, this offset correction value is zero so that an initial offset can be determined from the permanently darkened pixels 12. After adding in the offset correction value, the adder I outputs a signal to an analog to digital converter 2. The analog to digital converter 2 receives data from the multiplier 60 and converts the analog data, which has been corrected for offset and channel gain, into a digital signal and inputs the digital signal into a multiplier 3. Multiplier 3 multiplies the digital signal from the analog to digital converter 2 with a fast scan gain corrective value which will be discussed in more detail below.

To determine the offset correction value, FIG. 11 utilizes a circuit comprising a comparator 33, an adder 32, and a digital to analog converting circuit 31. These three circuits make up an offset corrective value generating circuit 35. The offset corrective value generating circuit 35 receives a reference value corresponding to the offset drift set point determined by an initial scanning of the permanently darkened pixels 12 upon powering up of the image sensors and the circuitry therefor.

The offset corrective value generating circuit 35 also receives a pixel-pixel offset correction value which represents a previously determined offset corrective value corresponding to the initial calibration steps executed prior to a scanning process and receives a signal corresponding to the black reference signal outputted by the permanently darkened pixels 12 during the present fast scan or sub-scanning process.

In the offset corrective value generating circuit 35, the offset drift set point signal and a signal or value representing the black reference signal are fed into a comparator 33. This comparator 33 determines whether the black reference signal generated by the permanently darkened pixels 12 during the scanning process has changed in comparison to the signal outputted by same permanently darkened pixels 12 during power-up or the previous sub-scan (the offset drift set point signal).

If the two signals are different, the comparator 33 generates a signal representing an adjustment value corresponding to the difference between the recent signal being produced by the permanently darkened pixels 12 and the signal produced at the time of power-up or a previous sub-scan. This signal is then fed into adder 32 which adds an adjustment value to the pixel-pixel offset corrective value determined during calibration. In other words, the adding of the adjustment value to the pixel-pixel offset corrective value provides offset compensation on a continual basis based upon the present operating characteristics or conditions of the image processing apparatus. The adjusted pixel-pixel offset correction value is then inputted into a digital to analog converter 31 which converts the digital signal to an actual voltage value representing the fast scan offset corrective value that is inputted into an adder 50.

The gain corrective value generator circuit 45 has a comparator 41 and a multiplier 40. Upon powering up the circuitry corresponding to the image sensors, a sample of a calibration strip is taken and pixel-pixel gain corrective value is determined. Also, a platen background is sampled and the value therefrom is saved as a reference for the fast scan profile. This reference value corresponds to the white drift or gain drift set point inputted into the comparator 41. The segmentation of this embodiment can be realized a variety of ways as described above with respect to FIG. 5.

For example, the pixel-pixel gain corrective value can be divided into a multitude of segments wherein one segment can correspond to one sensor chip. However, the segmentation can be greater; i.e., more than one segment per chip; or less; i.e., more than a chip per segment. It is noted that the selection of the segmentation can affect image quality. However, the gain reference values for each segment are averaged to produce a single value reference. It is noted that white reference signals from each chip could be isolated such that a gain reference value can be saved for each chip so that the gain corrective value can be individualized for each chip.

Between individual scans of a document, when the carriage is in a parked position (the position is illustrated in FIG. 2 with reference to a constant velocity transport system wherein the scanner 23 can sample the platen background 22 that is located between individual documents 21), the platen background 22 is sampled again to generate a white reference signal as sensor video data which the multiplexer 30 selects to be inputted into the adder 1. This white reference signal is inputted into the comparator 41 to be compared with the gain or white drift set point. The comparator 41 compares the white reference signal with the gain or white drift set point to determine if there has been a change in the gain characteristics of the sensor chip or full width array system.

If there is a difference between the white drift set point and the white reference signal, the comparator generates an adjustment signal for each segmentation corresponding to this difference wherein individual adjustment signals are used to make individual adjustments to the gain corrective values. These adjustment signals are fed to a multiplier 40 which multiplies the adjustment signal with the gain corrective value to produce adjusted gain corrective values. The multiplier 40 outputs the adjusted gain corrective values to a multiplier 3 which multiples the actual image data to compensate for gain drift in the segments.

FIG. 11 also includes a channel offset compensation circuit 55. This channel offset compensation circuit 55 has an adder 50, a variable voltage source 51, a switching circuit 52, and a comparator 53. Initially, a channel black reference signal is injected upon a channel through multiplexer 30. This channel black reference signal is sampled by the comparator 53 and compared with a black signal target value to establish an initial offset value point; i.e., the comparator 53 determines the offset value of the channel with respect to the difference between the sampled channel black reference signal and the black signal target value.

Upon determining the offset value, comparator circuit 53 outputs a signal corresponding to the offset value. The signal is fed through a switching circuit 52 and applied to the variable voltage source 51. The variable voltage source 51 generates an offset voltage in response to the signal received from the switching circuit 52. This offset voltage is fed to adder 50 where it is added to the offset corrective value (fast scan) generated by the offset corrective value generating circuit 35 to produce a fully adjusted offset voltage. This fully adjusted offset voltage is then applied to the sampled channel via adder 1 to compensate for fast scan offset drift and offset drift within that channel.

During operations of the device, the comparator 53 samples subsequent transmissions of channel black reference signal which are sent along a channel to determine whether the offset characteristics of the channel have changed due to operating conditions. The comparator 53 compares the subsequently sampled channel black reference signals with the same target value (black signal set point) to determined if there is a difference between the subsequently sampled channel black reference signal and the same target value. If there is a difference between the signals, the comparator 53 generates a new signal corresponding to the difference, thereby continually monitoring changes in the offset characteristics. This new signal produced by the comparator 53 is outputted to the variable voltage source 51 through the switching circuit 52. In response to this new signal received from the comparator 53, the variable voltage source 51 generates a new offset voltage to be applied to the adder 50 to compensate for any change in offset characteristics of the channel.

FIG. 11 further includes a channel gain compensation circuit 65. This channel gain compensation circuit 65 has a multiplier 60, a variable signal generator 61, a switching circuit 62, and a comparator 63. Initially, a channel white reference signal is injected upon a channel through multiplexer 30. This channel white reference signal is sampled by the comparator 63 and compared with a white signal target value to establish an initial gain value point; i.e., the comparator 63 determines the gain value of the channel with respect to the difference between the channel white reference signal and the white signal target value.

Upon determining the gain value, comparator circuit 63 outputs a signal corresponding to the gain value. The signal is fed through a switching circuit 62 and applied to the variable signal generator 61. The variable signal generator 61 generates a signal in response to the signal received from the switching circuit 62. This signal is then applied to the multiplier 60 of the sampled channel to correct for gain drift within that channel.

During operations of the device, the comparator 63 samples subsequent transmissions of a channel white reference signal which are sent along a channel to determine whether the gain characteristics of the channel have changed due to operating conditions. The comparator 63 compares the subsequently sampled channel white reference signals with the same target value (white signal set point) to determined if there is a difference between the subsequently sampled channel white reference signal and the same target value. If there is a difference between the signals, the comparator 63 generates a new signal corresponding to the difference, thereby continually monitoring change in the gain characteristics. This new signal produced by the comparator 63 is outputted to the variable signal generator 61 through the switching circuit 62. In response to this new signal received from the comparator 63, the variable signal generator 61 generates a new signal to be applied to the multiplier 60 of the channel to compensate for any change in gain characteristics of the channel.

Figure 12:
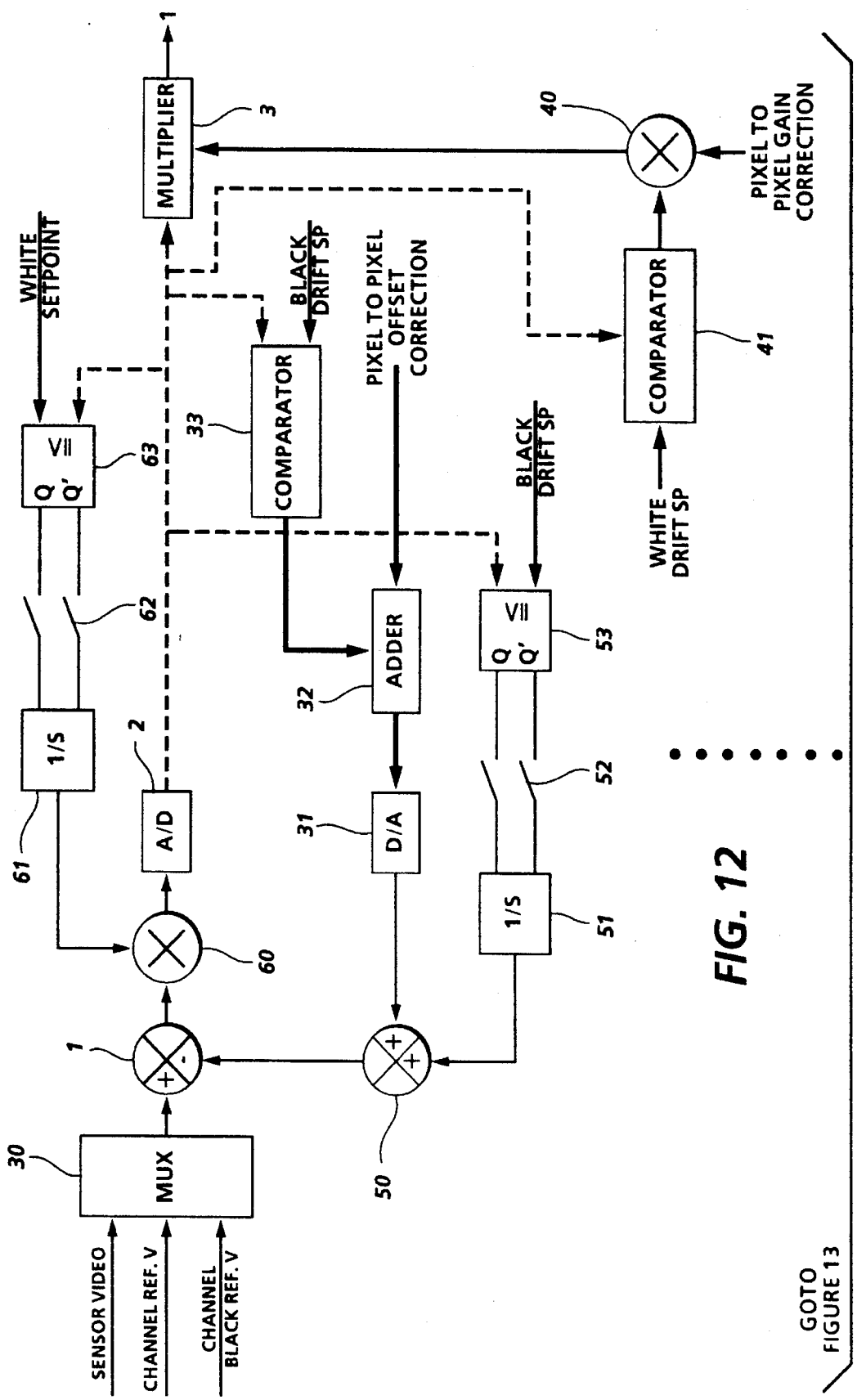
FIGS. 12 and 13 show block diagrams illustrating a further embodiment of FIG. 11 to be utilized in a multi-channel system.
Figure 13:
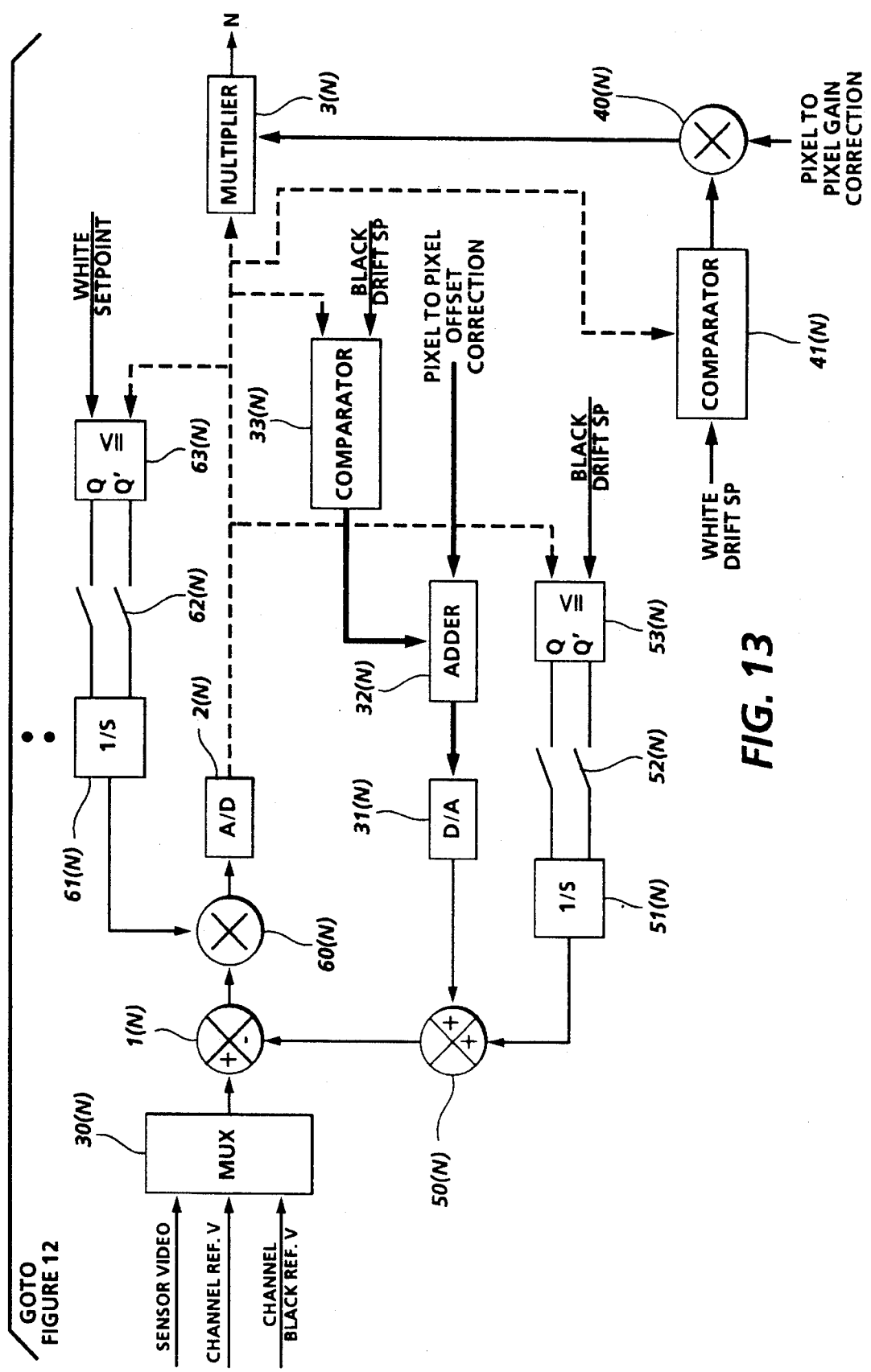

FIGS. 12 and 13 show block diagrams illustrating another embodiment of the present invention which corrects for offset and gain drift in a fast scan direction or for a constant velocity transport system and compensates for offset and gain drift in a plurality of communication channels to balance a multi-channel system. FIGS. 12 and 13 utilize the same circuitry as discussed with respect to FIG. 11, wherein the circuitry is illustrated as being redundant for each channel. It is noted that the same circuitry can be used for all channels by implementing a multiplexing system in the sampling of the channels as well as the adjusting of the channels characteristics. In this embodiment, the same black and white target values and the same channel black reference signal and channel white reference signal are used for each channel.

By injecting the same channel black reference signal into each channel of a plurality of channels making up a multi-channel system, and comparing the sampled signals against the same black target value for each channel, the offset characteristics of each channel within the multi-channel system can be matched to produce the same results. Thus, the matching of the offset characteristics of each channel in the multi-channel system can eliminate any banding or streaking due to slightly different response characteristics or transfer functions for each channel.

By injecting the same channel white reference signal into each channel of a plurality of channels making up a multi-channel system, and comparing the sampled signals against the same white target value for each channel, the gain characteristics of each channel within the multi-channel system can be also matched to produce the same results. Thus, the matching of the gain characteristics of each channel in the multi-channel system can eliminate any problems due to slightly different response characteristics or transfer functions for each channel.

Figure 14:
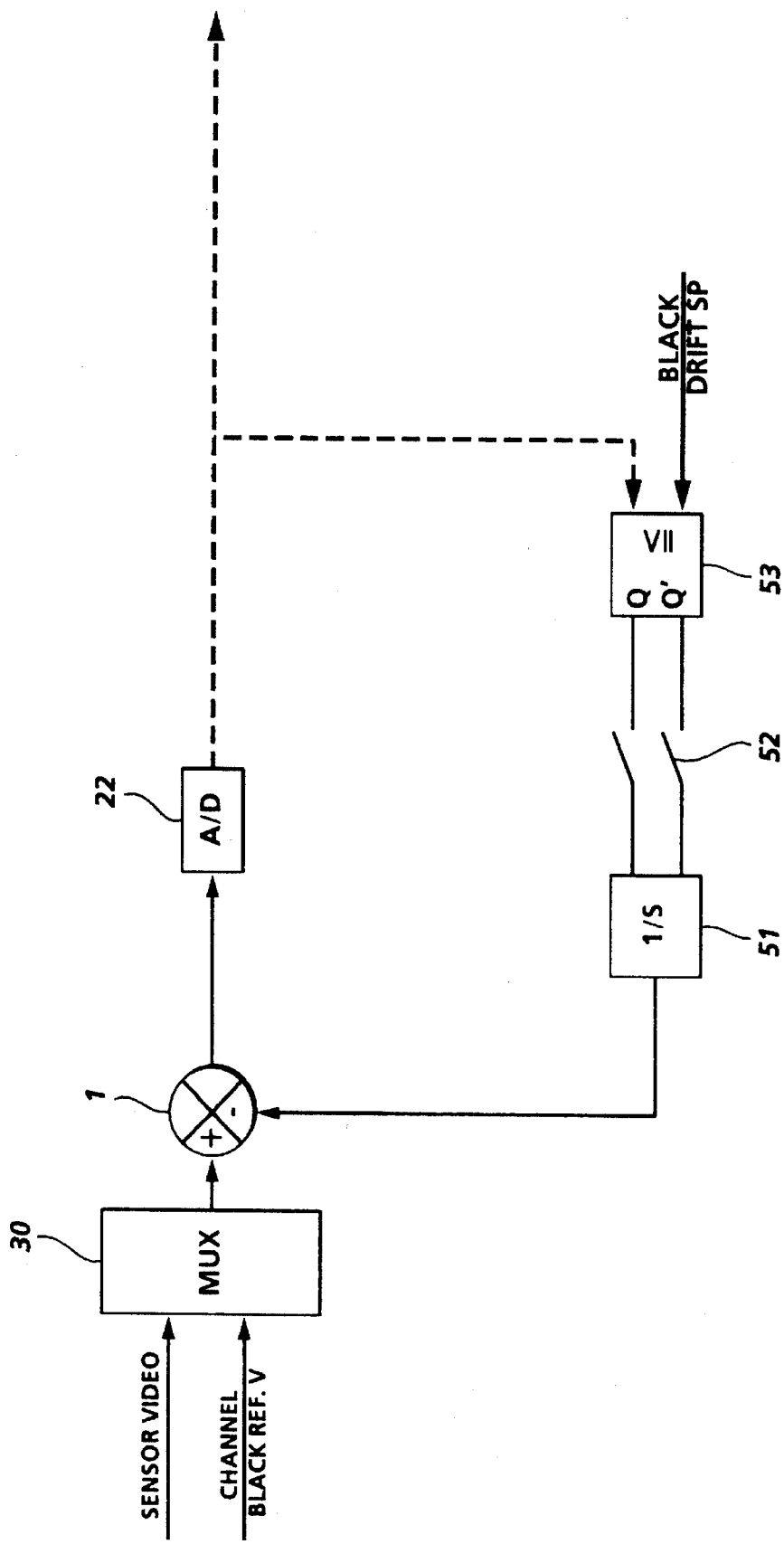
FIG. 14 shows a block diagram illustrating a tenth embodiment of the present invention which compensates for offset drift with respect to a channel's particular characteristics.

FIG. 14 shows a block diagram illustrating a tenth embodiment of the present invention which corrects for offset drift in a communication channel. FIG. 14 includes a multiplexer 30, an adder 1, an analog to digital converter 2, and a channel offset compensation circuit 55. This channel offset compensation circuit 55 has a variable voltage source 51, a switching circuit 52, and a comparator 53. Initially, a channel black reference signal is injected upon a channel through multiplexer 30. This channel black reference signal is sampled by the comparator 53 and compared with a black signal target value to establish an initial offset value point; i.e., the comparator 53 determines the offset value of the channel with respect to the difference between the channel black reference signal and the black signal target value.

Upon determining the offset value, comparator circuit 53 outputs a signal corresponding to the offset value. The signal is fed through a switching circuit 52 and applied to the variable voltage source 51. The variable voltage source 51 generates an offset voltage in response to the signal received from the switching circuit 52. This offset voltage is then applied to the sampled channel through adder 1 to compensate for offset drift within that channel.

During operations of the device, the comparator 53 samples subsequent transmissions of a channel black reference signal which are sent along a channel to determine whether the offset characteristics of the channel have changed due to operating conditions. The comparator 53 compares the subsequently sampled channel black reference signals with the same target value (black signal set point) to determined if there is a difference between the subsequently sampled channel black reference signal and the same target value. If there is a difference between the signals, the comparator 53 generates a new signal corresponding to the difference, thereby continually monitoring changes in the offset characteristics. This new signal produced by the comparator 53 is outputted to the variable voltage source 51 through the switching circuit 52. In response to this new signal received from the comparator 53, the variable voltage source 51 generates a new offset voltage to be applied to the channel through adder 1 to compensate for any change in offset characteristics of the channel.

Figure 15:
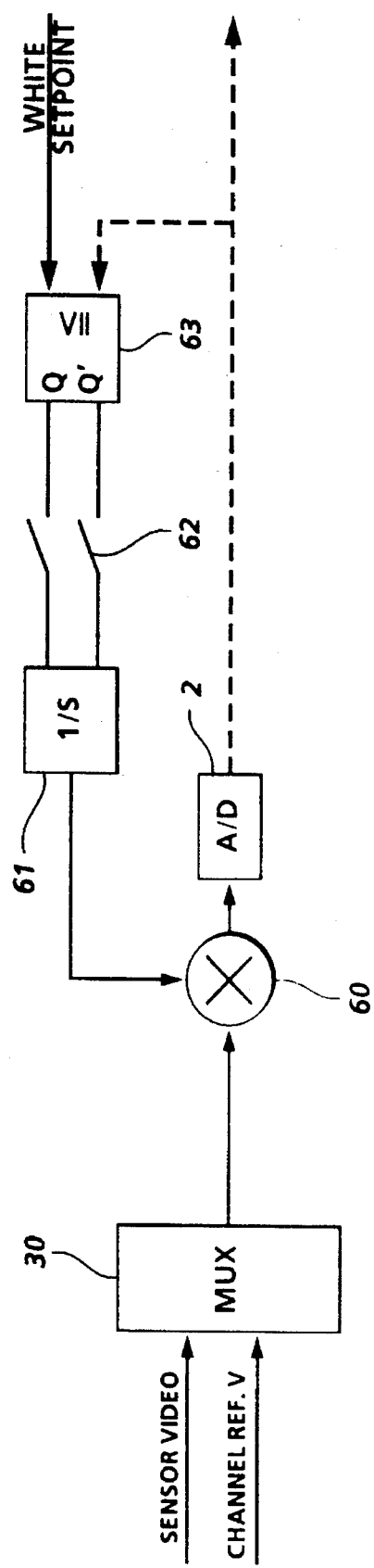
FIG. 15 shows a block diagram illustrating an eleventh embodiment of the present invention which compensates for gain drift with respect to a channel's particular characteristics.

FIG. 15 shows a block diagram illustrating an eleventh embodiment of the present invention which corrects for gain drift in a communication channel. FIG. 15 includes a multiplexer 30, a multiplier 60, an analog to digital converter 2, and a channel gain compensation circuit 65.

The channel gain compensation circuit 65 has a variable signal generator 61, a switching circuit 62, and a comparator 63. Initially, a channel white reference signal is injected upon a channel through multiplexer 30. This channel white reference signal is sampled by the comparator 63 and compared with a white signal target value to establish an initial gain value point; i.e., the comparator 63 determines the gain value of the channel with respect to the difference between the white reference signal and the white signal target value.

Upon determining the gain value, comparator circuit 63 outputs a signal corresponding to the gain value. The signal is fed through a switching circuit 62 and applied to the variable signal generator 61. The variable signal generator 61 generates a signal in response to the signal received from the switching circuit 62. This signal is then applied to the multiplier 60 of the sampled channel to compensate for gain drift within that channel.

During operations of the device, the comparator 63 samples subsequent transmission of a channel white reference signal which are sent along a channel to determine whether the gain characteristics of the channel have changed due to operating conditions. The comparator 63 compares the subsequently sampled channel white reference signals with the same target value (white signal set point) to determined if there is a difference between the subsequently sampled channel white reference signal and the same target value. If there is a difference between the signals, the comparator 63 generates a new signal corresponding to the difference, thereby continually monitoring changes in the gain characteristics. This new signal produced by the comparator 63 is outputted to the variable signal generator 61 through the switching circuit 62. In response to this new signal received from the comparator 63, the variable signal generator 61 generates a new signal to be applied to the multiplier 60 of the channel to compensate for any change in gain characteristics of the channel.

Figure 16:
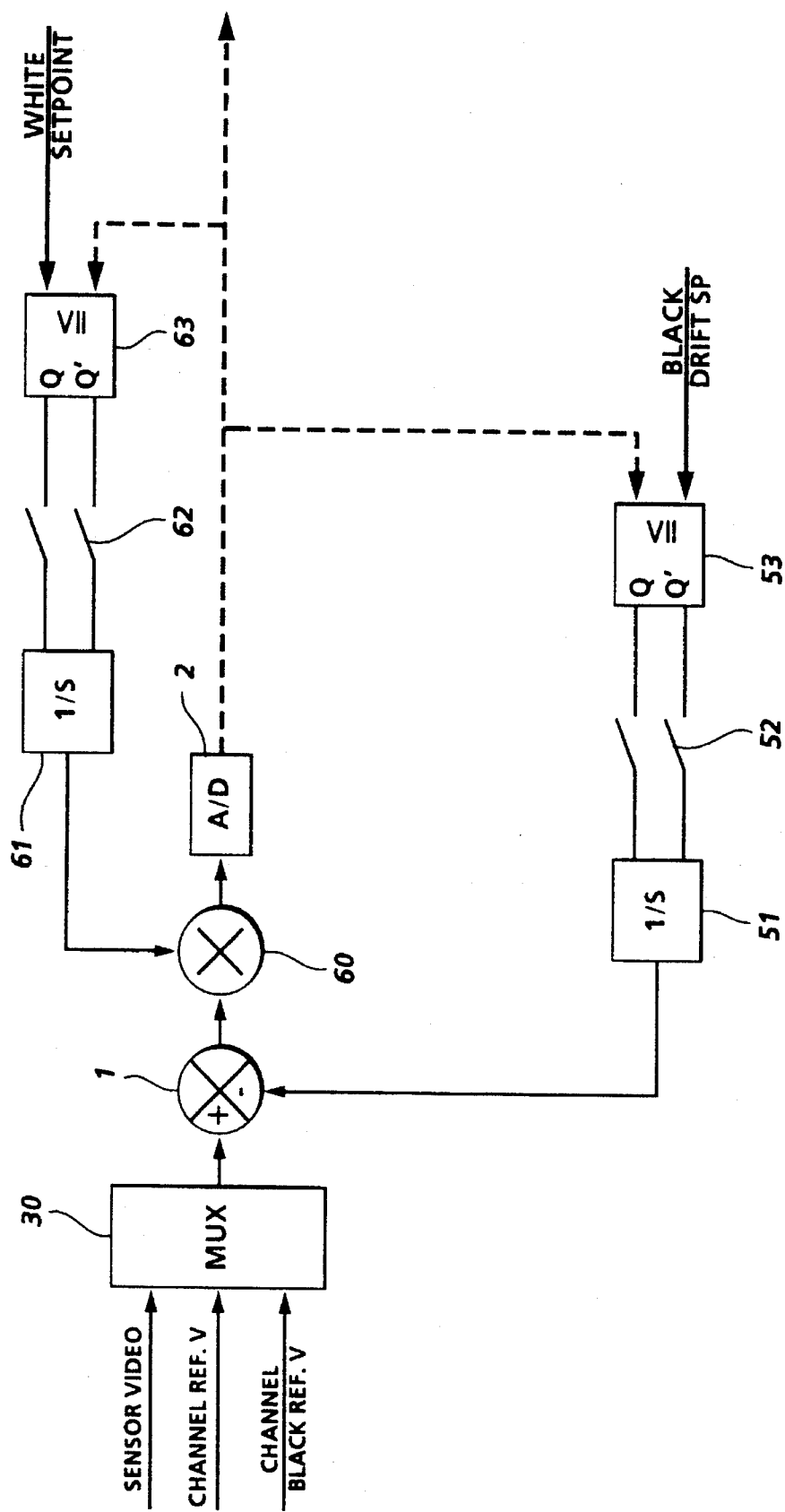
FIG. 16 shows a block diagram illustrating a twelfth embodiment of the present invention which compensates for both offset and gain drift with respect to a channel's particular characteristics.

FIG. 16 shows a block diagram illustrating a twelfth embodiment of the present invention which compensates both offset and gain drift in a communication channel. FIG. 16 includes a multiplexer 30, an adder 1, a multiplier 60, an analog to digital converter 2, a channel offset compensation circuit 55, and a channel gain compensation circuit 65.

The channel offset compensation circuit 55 and the channel gain compensation circuit 65 function the same as described above, to FIGS. 13 and 14, respectively; therefore, a detailed description thereof will be omitted. It is noted that the offset compensation is carried out prior to gain compensation to insure a more accurate gain calculation.

Figure 17:
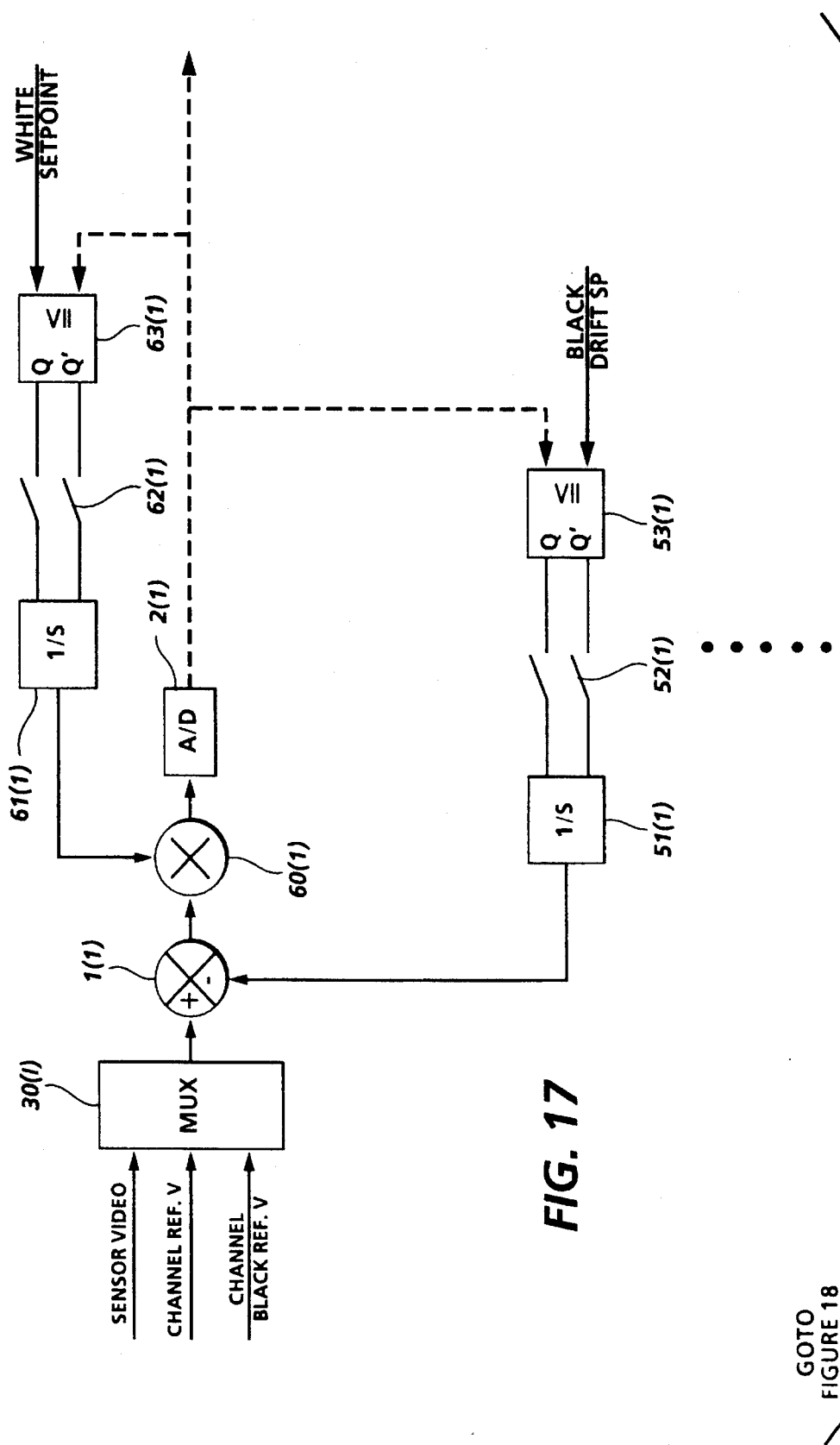
FIGS. 17 and 18 show block diagrams illustrating a further embodiment of FIG. 16 which balances the transfer functions or response characteristics of a multi-channel system.
Figure 18:
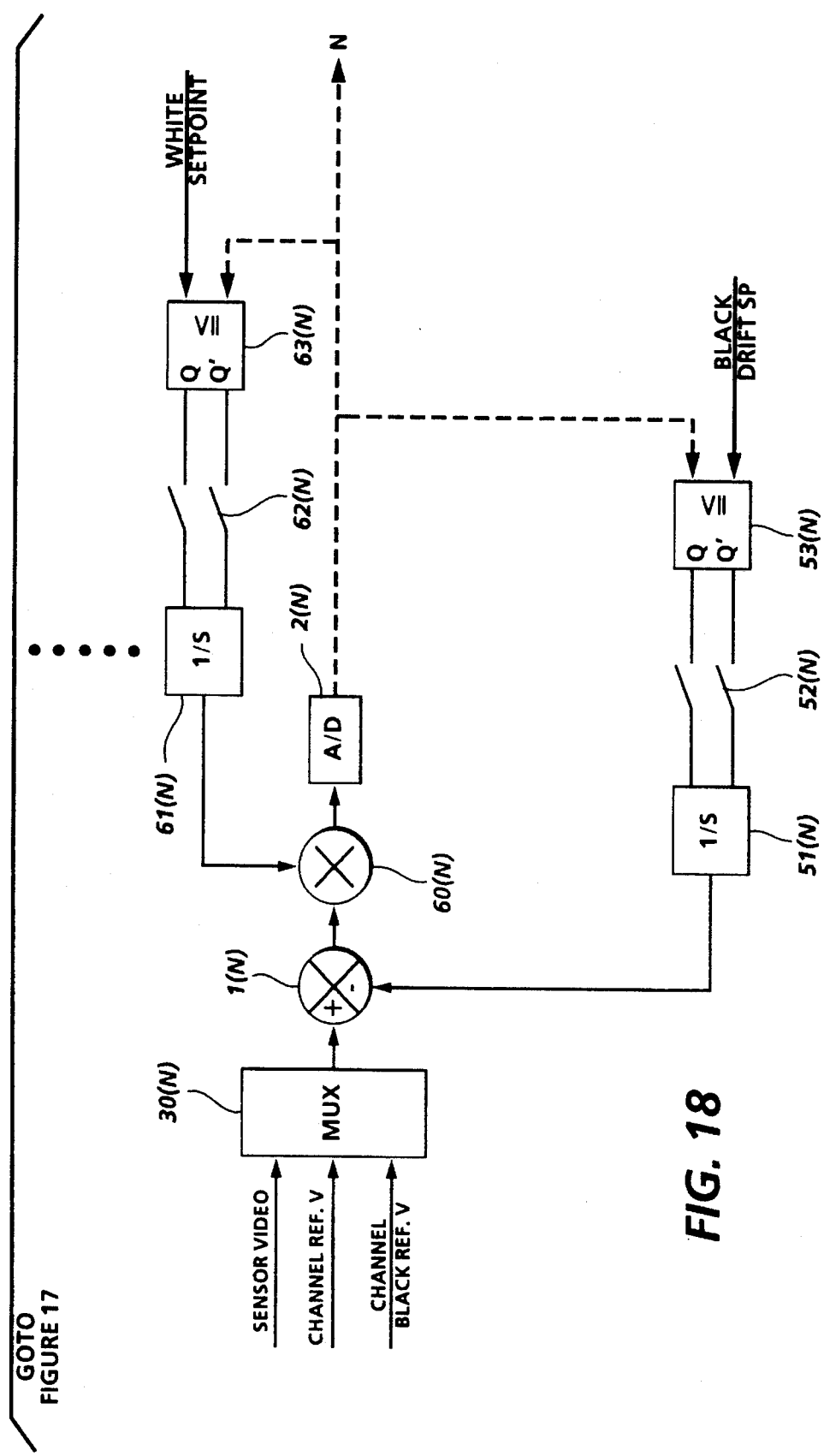

FIGS. 17 and 18 show block diagrams illustrating another embodiment of the present invention which compensates both offset and gain drift in a plurality of communication channels to balance a multi-channel system. FIGS. 17 and 18 utilize the same circuitry as discussed with respect to FIG. 16, but the circuitry is illustrated as being redundant for each channel. As discussed above, this circuitry can be reduced through multiplexing. In this embodiment the same black and white target values and the same channel black reference signal and channel white reference signal are used for each channel.

By injecting the same channel black reference signal into each channel of a plurality of channels making up a multi-channel system, and comparing the sampled signals against the same black target value for each channel, the offset characteristics of each channel within the multi-channel system can be matched to produce the same results. Thus, the matching of the offset characteristics of each channel in the multi-channel system can eliminate any banding or streaking due to slightly different response characteristics or transfer functions for each channel.

By injecting the same channel white reference signal into each channel of a plurality of channels making up a multi-channel system, and comparing the sampled signals against the same white target value for each channel, the gain characteristics of each channel within the multi-channel system can also be matched to produce the same results. Thus, the matching of the gain characteristics of each channel in the multi-channel system can eliminate any problems due to slightly different response characteristics or transfer functions for each channel.

Figure 19:
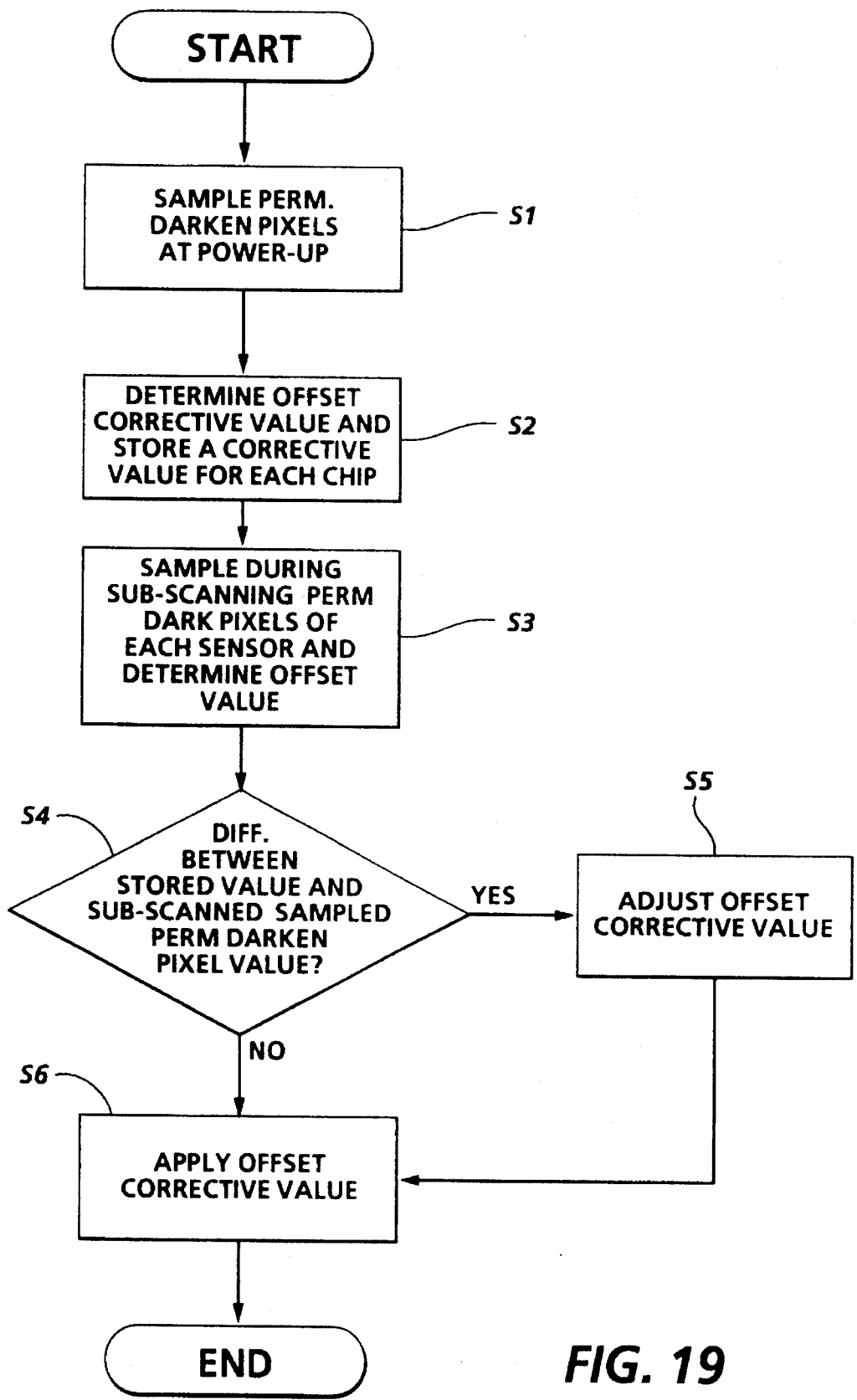
FIG. 19 illustrates a flow chart showing a method of the present invention which corrects offset drift with respect to a fast scan relationship.

FIG. 19 illustrates a method of the present invention which corrects for offset drift in a fast scan direction or in a constant velocity transport system. The method corrects fast scan offset drift in signals outputted by active pixels of an image apparatus. The method uses permanently darkened pixels to generate a reference value during an image forming process.

As illustrated in FIG. 19, step s1 samples an initial output from each permanently darkened pixels upon powering up image sensors and the circuitry therefor. At step s2, the present invention calculates a corrective offset value and stores it as a reference value for the corresponding permanently darkened pixel. The present invention then, at step s3, samples, during a sub-scanning or fast scan process of an image, an output from each permanently darkened pixel and a plurality of active pixels. At step s4, the method determines if there is a difference between the stored reference value and the output of each permanently darkened pixel sampled during the execution of step s3. If there is a difference, step s5 adjusts an offset level to be applied to each signal outputted from the active pixels, sampled during the execution of step s3, according to the difference determined in step s4. At step s6, either the adjusted corrective offset value is applied or the unadjusted corrective offset value is applied depending upon the determination in step s4. By readjusting the corrective offset value in this way, the present invention can compensate for fast scan offset drift in the signals outputted from the active pixels.

Figure 20:
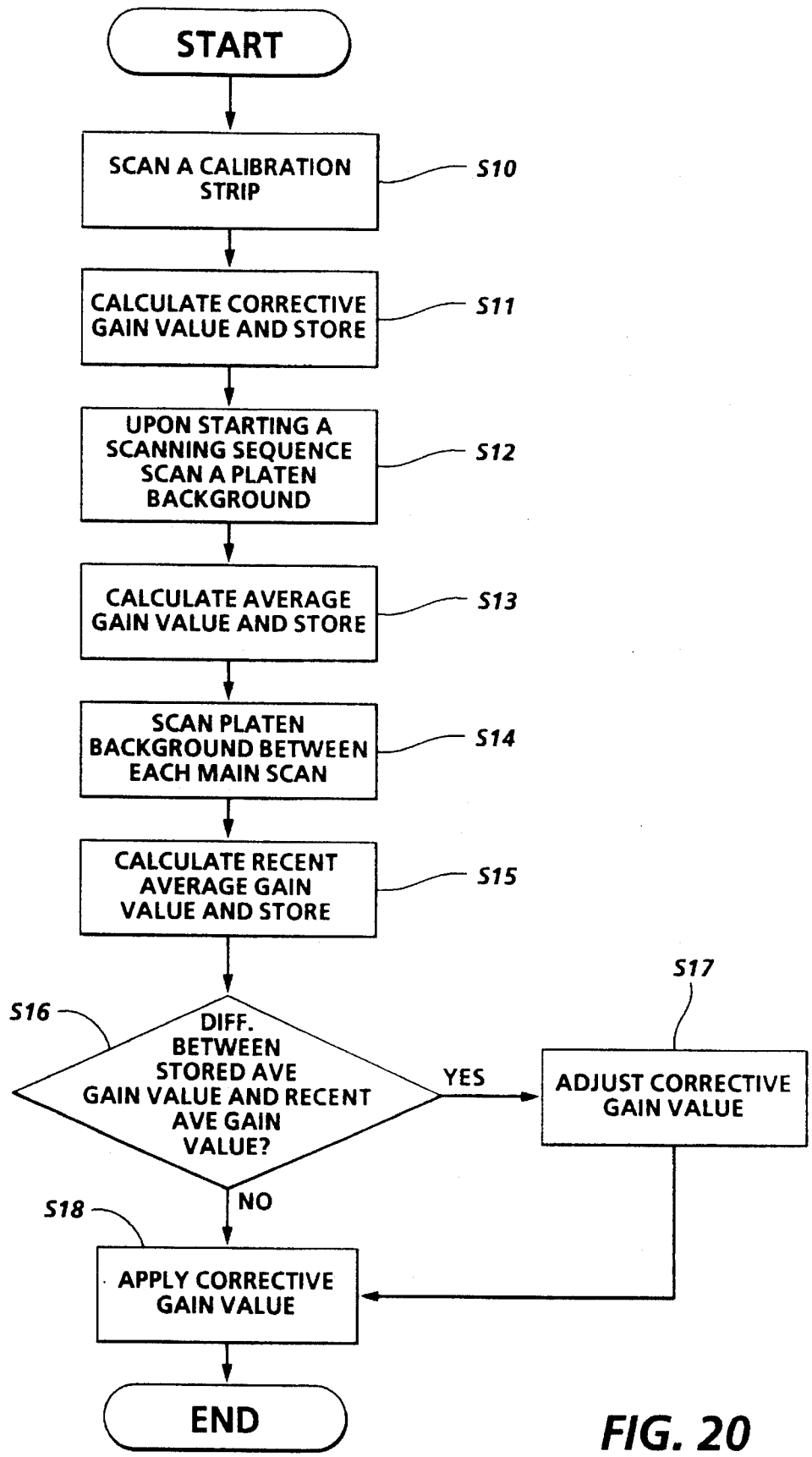
FIG. 20 illustrates a flow chart method of the present invention which compensates for gain drift with respect to a fast scan relationship.

FIG. 20 illustrates a method of the present invention which corrects for gain drift in a fast scan direction or in a constant velocity transport system. This method corrects fast scan gain drift in signals outputted from of active pixels of an image apparatus by performing the following steps.

At step s10, the present invention scans a calibration strip and samples an initial output signal from each active pixel produced as a result of scanning the calibration strip. At step s11, a gain corrective value is calculated from the output sampled in step s10 and stored. At step s12, an output from each active pixel is sampled during an initial scanning of a background. Then at step s13, an average gain value is calculated from the output sampled in step s12 and stored as a reference value. The method again samples an output from each active pixel produced as a result of a scanning of a background between a complete scanning of an image at step s14. From these subsequent samples, a new average gain value is calculated at step s15. At step s16, the present invention determines if there is a difference between the stored reference value and the average gain value calculated in step s15. If step s16 determines a difference, step s17 adjusts the gain corrective value according to the difference determined in step s16. At step s18, either the adjusted corrective gain value or the unadjusted corrective gain value is applied depending upon the determination in step s16. By readjusting the corrective gain value in this way, the present invention can compensate for fast scan gain drift in the signals outputted from the active pixels.

Figure 21:
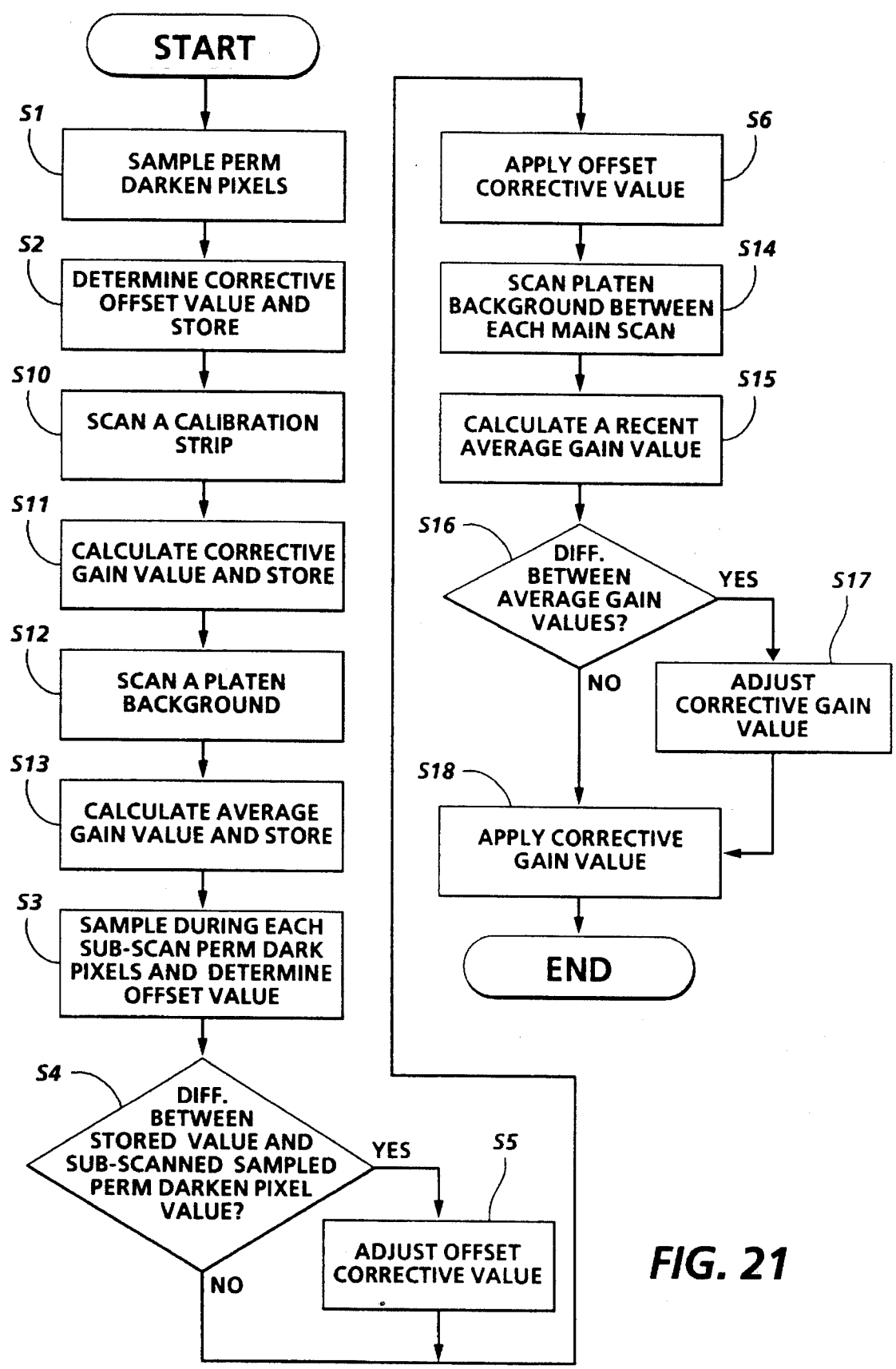
FIG. 21 illustrates a flow chart showing a method of the present invention which compensates for both offset and gain drift with respect to a fast scan relationship.

FIG. 21 illustrates a method of the present invention which compensates for both offset and gain drift in a fast scan direction or in a constant velocity transport system. The steps illustrated in FIG. 21 correspond to the steps discussed above with respect to FIGS. 19 and 20. FIG. 21 merely illustrates a preferred method for the dual compensation of offset and gain drift.

Figure 22:
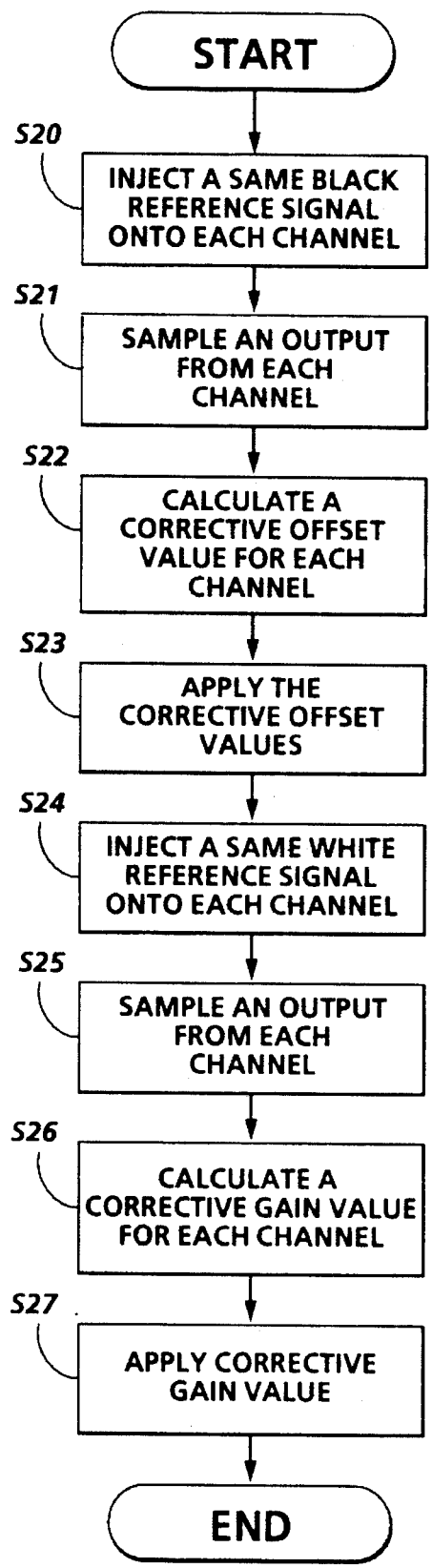
FIG. 22 illustrates a flow chart showing a method which balances the transfer functions of a multi-channel system, thereby compensating for both offset and gain drift within a particular channel.

FIG. 22 illustrates a method of the present invention which corrects for offset and gain drift in a plurality of communication channels transporting data. The following are the steps of this method.

At step s20, the present invention injects a same channel black reference signal onto each channel of a plurality of channels. At step s21, the present invention samples an output from each channel downstream of a point where the channel black reference signal was injected. The method then calculates a separate offset value for each channel at step s22 by comparing the sampled channel black reference signal with a same target black signal value. The procedure further applies an offset voltage to each channel according to the calculated offset value corresponding to that channel at step s23, thereby correcting an offset characteristic of the channel and balancing the offsets for the plurality of channels.

At step s24, the present invention injects a same channel white reference signal onto each channel of a plurality of channels. At step s25, the present invention samples an output from each channel downstream of a point where the channel white reference signal was injected. The method then calculates a separate gain value for each channel at step s26 by comparing the sampled channel white reference signal with a same target white signal value. The procedure further applies a gain to each channel according to the calculated gain value corresponding to that channel at step s27, thereby correcting a gain characteristic of the channel and balancing the gains for the plurality of channels.

Although the present invention has been described in detail above, various modifications can be implemented without imparting from its spirit. For example, the offset values can be stored in a digital memory or as actual voltages in a capacitor bank.

Moreover, even though the invention has been described in an image processing context, the methods and concepts are readily applicable to other environments. For example, the offset drift and gain drift compensation schemes are equally applicable to systems processing data wherein the components are subject to different operating conditions which would make a standard compensation value less effective. More specifically, offset and gain drifts for a sensor operating near absolute zero, will be different from the offset and gain drifts of a sensor operating at room temperature.

Furthermore, the channel compensation process is equally applicable to any communication path that has its transfer function continually changing in view of operating conditions. More specifically, the channels of communication are not limited to a hardwire in an image processing device, but may be telephone lines, radio frequencies, or other channels of communication susceptible to external conditions or require compensation for individualized transfer functions. In the preferred embodiment, the multi-channel system carries a single image which has been partitioned or split up into small fragments which are communicated in parallel between the sensors and the image processor or other device. However, this multi-channel system can carry a plurality of images wherein a single image is assigned to a single channel when the system requires a uniform transfer function for each channel, thus the type of data being communicated over the channels is not limited to fragmentations of a single image.

Lastly, the black drift set point value for the pixel offset correction circuit and the black drift set point value for the channel offset correction circuit may be the same values or different values. In the preferred embodiment, the two black drift set point values are different. Also, the white drift set point value for the pixel gain correction circuit and the white drift set point value for the channel gain correction circuit may be the same values or different values. In the preferred embodiment, the two white drift set point values are different.

While the invention has been described with reference to the various embodiments disclosed above, it is not confined to the details set forth above, but is intended to cover such modifications and changes as may come within the scope of the attached claims.

What is claimed is:

1. A method for correcting gain drift in a fast scan direction during an image forming process in an image apparatus having image sensors including a plurality of active pixels and permanently darkened pixels and control circuitry therefor, comprising the steps of:

(a) sampling the plurality of active pixels during a scanning of a calibration strip;

(b) calculating a gain corrective value from the samples collected during the scanning of the calibration strip;

(c) sampling the active pixels during scannings of a platen background;

(d) calculating a difference between sequential samples of the active pixels during the scannings of the platen background; and (e) adjusting continually the gain corrective value according to the difference and applying the adjusted gain corrective value to image data signals produced by active pixels.

2. The method as claimed in claim 1, further comprising the steps of:

(f) sampling the plurality of permanently darkened pixels upon powering up the image sensors and control circuitry thereof and during a sub-scanning process of an image, (g) calculating a difference between sequential samples of the permanently darkened pixels upon powering up the image sensors and control circuitry thereof and during the sub-scanning process of the image, and (h) generating and applying a pixel offset voltage to image data signals produced by active pixels, the pixel offset voltage continually changing according to the difference between sequential samples of the permanently darkened pixel.

3. The method as claimed in claim 1, comprising the steps of:

(f) storing the gain corrective value;

(g) calculating an average gain value from the output sampled in said step (c);

(h) storing the average gain value as a reference value;

(i) sampling an output from each active pixel produced as a result of a scanning of a background between a complete scanning of an image;

(j) calculating an average gain value from the output sampled in said step (i); and (k) determining a difference between the stored reference value and the average gain value calculated in said step (i);

said step (e) continually adjusting the gain corrective value according to the difference determined in said step (k).

4. The method as claimed in claim 3, further comprising the steps of:

(l) sampling an initial output from each of a plurality of permanently darkened pixels upon powering up image sensors and circuitry therefor;

(m) storing each sampled output as a reference value for the corresponding permanently darkened pixel;

(n) sampling, during a sub-scanning process of an image, an output from each permanently darkened pixel and each active pixel;

(o) determining a difference between the stored reference value and the output of each permanently darkened pixel sampled during the execution of said step (n), and (p) adjusting an offset level to be applied to each signal output of the active pixels sampled during the execution of said step (n) according to the difference determined in said step (o).

5. The method as claimed in claim 4, wherein said step (m) stores the reference values in a memory.

6. The method as claimed in claim 4, wherein said step (m) stores the reference values as electrical charges in a capacitor bank.

7. A system for balancing an offset characteristic for a multi-channel system in an image apparatus having image sensors including a plurality of active pixels and permanently darkened pixels and control circuitry therefor, comprising:

first means for sampling an output of each channel;

channel offset means for generating and applying a separate channel offset voltage to each channel, said channel offset voltage continually changing according to sequential samples of each channel, thereby balancing an offset characteristic of the multi-channel system;

sampling means for sampling the plurality of permanently darkened pixels upon powering up the image sensors and the control circuitry therefor and during a fast scan of an image;

first difference means for calculating a difference between sequential samples of the permanently darkened pixels upon powering up the image sensors and control circuitry therefor and during the fast scan of the image;

pixel offset means for generating and applying a pixel offset voltage to image data signals produced by the plurality of active pixels according to the difference between sequential samples of the permanently darkened pixel;

said sampling means sampling a plurality of active pixels during a scanning of a calibration strip;

second means, operatively connected to said sampling means, for calculating a gain corrective value from the samples collected during the scanning of the calibration strip;

said sampling means sampling the active pixels during scannings of a platen background;

second difference means for calculating a difference between sequential samples of the active pixels during the scannings of the platen background;

pixel gain means for continually adjusting the gain corrective value according to the difference between sequential samples of the platen background.

8. A system for correcting gain drift in a fast scan direction during an image forming process using a platen background in an image apparatus having image sensors including a plurality of active pixels and permanently darkened pixels and control circuitry therefor, comprising:

sampling means for sampling the plurality of active pixels during a scanning of a calibration strip;

first means, operatively connected to said sampling means, for calculating a gain corrective value from the samples collected during the scanning of the calibration strip;

said sampling means sampling the active pixels during scannings of the platen background;

first difference means for calculating a difference between sequential samples of the active pixels during the scannings of the platen background;

pixel gain means for adjusting said gain corrective value according to the difference between sequential samples of the platen background and applying the adjusted gain corrective value to image data signals produced by active pixels.

9. The system as claimed in claim 8, further comprising:

second means for sampling the plurality of permanently darkened pixels upon powering up image sensors and circuitry therefor and during a fast scan of an image;

second difference means for calculating a difference between sequential samples of the permanently darkened pixels upon powering up the image sensors and control circuitry therefor and during the fast scan of the image; and pixel offset means for generating and applying a pixel offset voltage to image data signals produced by the plurality of active pixels according to the difference between sequential samples of the permanently darkened pixel.

10. The system as claimed in claim 8, wherein:

said sampling means samples an output from each active pixel produced as a result of an initial scanning of a background;

said first means calculates an average gain value from the output sampled as a result of an initial scanning of the background;

said pixel gain means stores the average gain value as a reference value;

said sampling means samples an output from each active pixel produced as a result of a scanning of the background between complete scannings of an image;

said first means calculates an average gain value from the output sampled as a result of a scanning of the background between a complete scanning of an image; and said pixel gain means determines a difference between the stored reference value and the average gain value calculated as a result of a scanning of the background between a complete scanning of an image and adjusts the gain corrective value according to the determined difference.

11. The system as claimed in claim 10, further comprising:

second means for sampling an initial output from each of the plurality of permanently darkened pixels upon powering up the image sensors and control circuitry therefor;

third means for storing each sampled output as a reference value for the corresponding permanently darkened pixel;

said sampling means and said second means sampling, during a fast scan of an image, an output from each of the plurality of permanently darkened pixels and each of the plurality of active pixels;

fourth means for determining a difference between the stored reference value and the output of each permanently darkened pixel sampled during a sub-scanning process of an image; and fifth means for adjusting an offset level to be applied to each signal outputted from of the active pixels sampled during a sub-scanning process of an image according to the difference determined by said fourth means.

12. The system as claimed in claim 11, wherein said third means is a memory.

13. The system as claimed in claim 11, wherein said third means is a capacitor bank.

14. A system for balancing a gain characteristic for a multi-channel system in an image apparatus, comprising:

first means for sampling an output of each channel;

channel gain means for generating and applying a separate channel gain to each channel, said channel gain continually changing according to sequential samples of each channel, thereby balancing a gain characteristic of the multi-channel system;

sampling means for sampling a plurality of active pixels during a scanning of a calibration strip;

second means, operatively connected to said sampling means, for calculating a gain corrective value from the samples collected during the scanning of the calibration strip;

said sampling means sampling the active pixels during scannings of a platen background;

first difference means for calculating a difference between sequential samples of the active pixels during the scannings of the platen background; and pixel gain means for continually adjusting the gain corrective value according to the difference between sequential samples of the platen background.

15. The system as claimed in claim 14, further comprising:

third means for sampling a plurality of permanently darkened pixels upon powering up image sensors and circuitry thereof and during a sub-scanning process of an image;

second difference means for calculating a difference between sequential samples of the permanently darkened pixels upon powering up the image sensors and control circuitry thereof and during the sub-scanning process of the image; and pixel offset means for generating a pixel offset voltage, said pixel offset voltage continually changing according to the difference between sequential samples of the permanently darkened pixel, thereby compensating for fast scan offset drift.

16. The system as claimed in claim 15, further comprising:

fourth means for sampling an output of each channel; and channel offset means for generating and applying a separate channel offset voltage to each channel, said channel offset voltage continually changing according to sequential samples of each channel, thereby balancing an offset characteristic of the multi-channel system.

17. A method for correcting a gain characteristic for a communication channel of a video system, comprising the steps of:

(a) injecting a channel white reference signal onto a channel;

(b) sampling an output of the channel downstream of a point where the channel white reference signal was injected in said step (a);

(c) calculating a gain value for the channel in accordance with the output sampled in said step (b);

(d) applying a gain to the channel according to the calculated gain value, thereby correcting a gain characteristic of the channel;

(e) sampling an initial output from a plurality of active pixels produced as a result of scanning a calibration strip;

(f) calculating a gain corrective value from the output sampled in said step (e);

(g) sampling an output from each active pixel produced as a result of scannings of a platen background between complete scannings;

(i) determining changes between sequential samples of the active pixels during the scannings of the platen background; and (i) adjusting the pixel gain corrective value according to the changes in the sampled output of step (g).

18. The method as claimed in claim 17, wherein said steps (a)–(d) are repeated periodically so that the gain values can be adjusted for changes in the response characteristics of the channel due to changes in operating conditions.

19. The method as claimed in claim 17, wherein:

said step (a) injects a same channel white reference signal onto each channel of a plurality of channels;

said step (b) samples an output of each channel downstream of a point where the channel white reference signal was injected in said step (a);

said step (c) calculates a separate gain value for each channel in accordance with the output sampled therefrom in said step (b); and said step (d) applies a separate gain to each channel according to the calculated gain value corresponding to that channel, thereby correcting a gain characteristic of the channel and balancing the gains of the plurality of channels.

20. The method as claimed in claim 17, further comprising the steps of:

(j) sampling an initial output from each of a plurality of permanently darkened pixels upon powering up image sensors and circuitry thereof;

(k) sampling, during a sub-scanning process of an image, an output from each permanently darkened pixel;

(l) calculating a difference between samples of the permanently darkened pixels upon powering up the image sensors and control circuitry thereof and during the sub-scanning process of the image; and (m) generating a pixel offset voltage according to the difference between the output of each permanently darkened pixel sampled during the execution of said step (j) and the output of each permanently darkened pixel sampled during the execution of said step (k).

21. The method as claimed in claim 20, further comprising the steps of:

(n) injecting a channel black reference signal onto a channel;

(o) sampling an output of the channel downstream of a point where the channel black reference signal was injected in said step (n);

(p) calculating an offset value for the channel in accordance with the output sampled in said step (o); and (q) applying an offset voltage to each channel according to the calculated offset value corresponding to that channel, thereby correcting an offset characteristic of the channel and balancing the offsets for the plurality of channels;

said steps (n)–(q) being performed before the execution of said steps (a)–(d).

22. The method as claimed in claim 21, wherein said steps (a)–(d) and (n)–(q) are repeated periodically so that the offset values and the gain values can be adjusted for changes in the response characteristics of the channel due to changes in operating conditions.

23. The method as claimed in claim 22, wherein:

said step (n) injects a same channel black reference signal onto each channel of a plurality of channels;

said step (o) samples an output from each channel downstream of a point where the channel black reference signal was injected in said step (n);

said step (p) calculates a separate offset value for each channel in accordance with the output sampled therefrom in said step (o);

said step (a) injects a same channel white reference signal onto each channel of a plurality of channels;

said step (b) samples an output of each channel downstream of a point where the channel white reference signal was injected in said step (a);

said step (c) calculates a separate gain value for each channel in accordance with the output sampled therefrom in said step (b);

said step (q) applies an offset voltage to each channel according to the calculated offset value corresponding to that channel, thereby correcting an offset characteristic of the channel and balancing the offsets for the plurality of channels; and said step (d) applies a gain to each channel according to the calculated gain value corresponding to that channel, thereby correcting a gain characteristic of the channel and balancing the gains for the plurality of channels.

24. A method for correcting an offset characteristic for a communication channel of a video system, comprising the steps of:

(a) injecting a channel black reference signal onto a channel;

(b) sampling an output of the channel downstream of a point where the channel black reference signal was injected in said step (a);

(c) calculating an offset value for the channel in accordance with the output sampled in said step (b);

(d) applying an offset voltage to the channel according to the calculated offset value, thereby correcting an offset characteristic of the channel;

(i) sampling an initial output from each active pixel produced as a result of scanning a calibration strip;

(j) calculating a gain corrective value from the output sampled in said step (i);

(k) storing the gain corrective value;

(l) sampling an output from each active pixel produced as a result of an initial scanning of a background;

(m) calculating an average claim value from the output sampled in said step (k);

(n) storing the average gain value as a reference value;

(o) sampling an output from each active pixel produced as a result of a scanning of a background between complete scannings of an image;

(p) calculating an average gain value from the output sampled in said step (o);

(q) determining a difference between the stored reference value and the average gain value calculated in said step (p); and (r) adjusting the gain corrective value according to the difference determined in said step (q).

25. The method as claimed in claim 24, wherein:

said step (a) injects a same channel black reference signal onto each channel of a plurality of channels;

said step (b) samples an output from each channel downstream of a point where the channel black reference signal was injected in said step(a);

said step (c) calculates a separate offset value for each channel in accordance with the output sampled therefrom in said step (b); and said step (d) applies an offset voltage to each channel according to the calculated offset value corresponding to that channel, thereby correcting an offset characteristic of the channel and balancing the offsets for the plurality of channels.

26. The method as claimed in claim 25, further comprising the steps of:

(e) sampling an initial output from each of a plurality of permanently darkened pixels upon powering up image sensors and circuitry therefor;

(f) storing each sampled output as a reference value for the corresponding permanently darkened pixel;

(g) sampling, during a sub-scanning process of an image, an output from each permanently darkened pixel and each active pixel; and (h) generating a pixel offset voltage according to a difference between the stored reference value and the output of each permanently darkened pixel sampled during the execution of said step (g).

27. The method as claimed in claim 24, further comprising the steps of:

(s) injecting a channel white reference signal onto a channel;

(t) sampling an output of the channel downstream of a point where the channel white reference signal was injected in said step (s);

(u) calculating a channel gain value for the channel in accordance with the output sampled in said step (t); and (v) applying a gain to the channel according to the calculated channel gain value, thereby correcting a gain characteristic of the channel.

28. The method as claimed in claim 27, wherein:

said step (a) injects a same channel white reference signal onto each channel of a plurality of channels;

said step (b) samples an output of each channel downstream of a point where the channel white reference signal was injected in said step (a);

said step (c) calculates a separate channel gain value for each channel in accordance with the output sampled therefrom in said step (b); and said step (d) applies a separate gain to each channel according to the calculated channel gain value corresponding to that channel, thereby balancing a gain characteristic of the plurality of channels.

* * * * *